(12) United States Patent
Yamamoto et al.

(10) Patent No.: US 8,959,916 B2
(45) Date of Patent: Feb. 24, 2015

(54) THERMAL POWER PLANT

(75) Inventors: Kenji Yamamoto, Hitachinaka (JP);
Masato Handa, Mito (JP); Naoyuki Nagafuchi, Tokai (JP); Naohiro Kusumi, Hitachinaka (JP); Mitsuko Fukuda, Hitachi (JP); Tsuyoshi Shibata, Hitachiota (JP); Shinji Matsuura, Hitachi (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 333 days.

(21) Appl. No.: 13/281,981

(22) Filed: Oct. 26, 2011

(65) Prior Publication Data
US 2012/0102955 A1    May 3, 2012

(30) Foreign Application Priority Data
Oct. 27, 2010   (JP) ................................ 2010-240209

(51) Int. Cl.
*F01K 13/00*   (2006.01)
*F01K 17/00*   (2006.01)
*F22B 37/24*   (2006.01)

(52) U.S. Cl.
CPC ............... *F01K 13/00* (2013.01); *F22B 37/24* (2013.01)
USPC ............................................. 60/677; 60/653

(58) Field of Classification Search
USPC ........................................... 60/653, 677–679
See application file for complete search history.

(56) References Cited

U.S. PATENT DOCUMENTS

| 4,057,715 A * | 11/1977 | Jones et al. ................ 700/290 |
| 8,201,410 B2 * | 6/2012 | Imano et al. ................ 60/647 |
| 8,515,582 B2 | 8/2013 | Jia et al. |
| 2007/0131151 A1 | 6/2007 | Chenevert |
| 2008/0276844 A1 * | 11/2008 | Yamamoto et al. ........ 110/234 |
| 2009/0013717 A1 * | 1/2009 | Darde et al. ................ 62/617 |
| 2010/0213714 A1 | 8/2010 | Feng |

FOREIGN PATENT DOCUMENTS

| CN | 1982781 A | 6/2007 |
| CN | 101063872 A | 10/2007 |
| CN | 101372905 A | 2/2009 |
| JP | 64-51704 * | 3/1989 |
| JP | 64-51704 U | 3/1989 |
| JP | 2005-315137 A | 11/2005 |
| JP | 2010-043562 * | 11/2008 |
| JP | 2009-166013 A | 7/2009 |
| JP | 2010-43562 A | 2/2010 |
| JP | 2010-525219 | 7/2010 |

OTHER PUBLICATIONS

Chinese Office Action dated Dec. 23, 2013, with English translation (23 pages).
Japanese Office Action dated Dec. 3, 2013, with English translation (5 pages).

* cited by examiner

*Primary Examiner* — Hoang Nguyen
(74) *Attorney, Agent, or Firm* — Crowell & Moring LLP

(57) ABSTRACT

A thermal power plant is proposed for achieving high reliability, low material cost, and low construction cost by devising the arrangement and structures of a boiler, steam turbines, and a flue gas treatment apparatus to reduce a usage amount of high-temperature resistance material and further to reduce a thermal elongation of piping. In a thermal power plant including a 2 pass-type boiler having a furnace for burning fuel, a rear heat recovery area for recovering heat from combustion gas exhausted from the furnace, steam turbines are arranged near the rear heat recovery area.

8 Claims, 30 Drawing Sheets

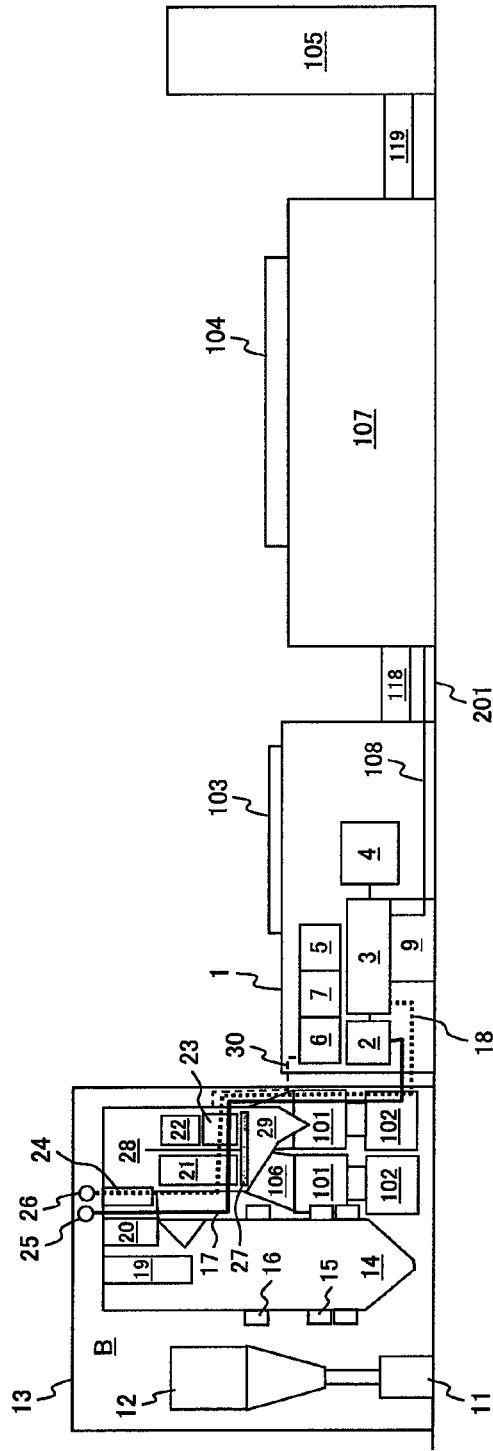

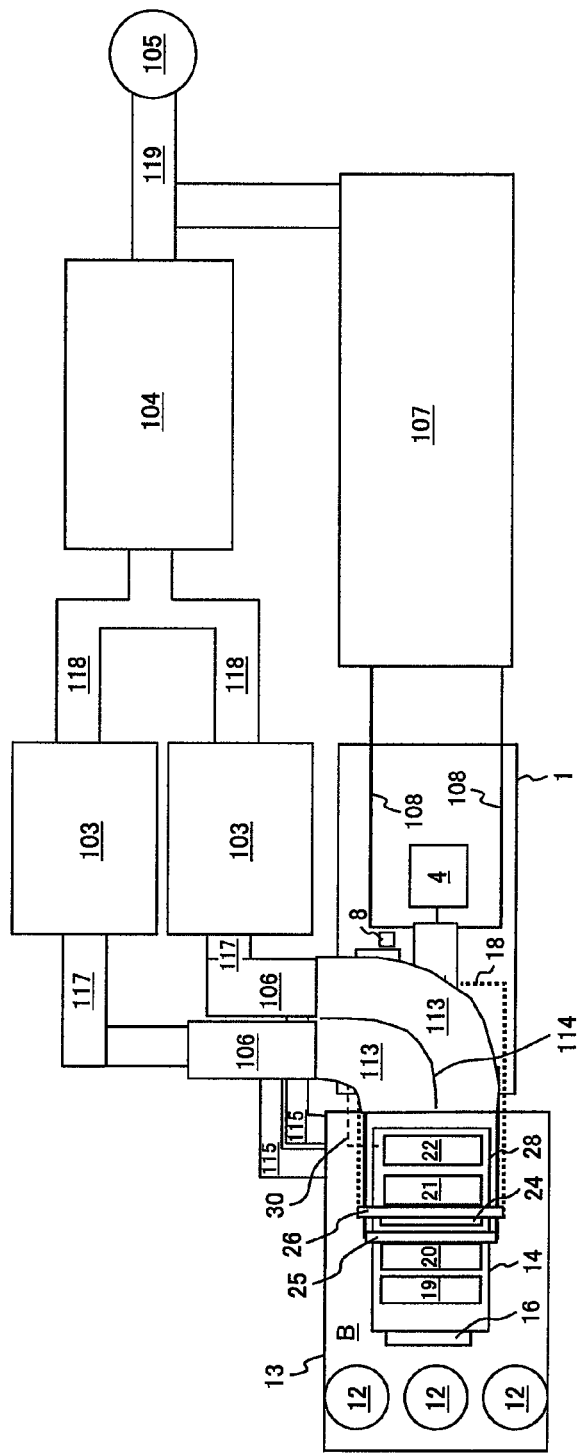

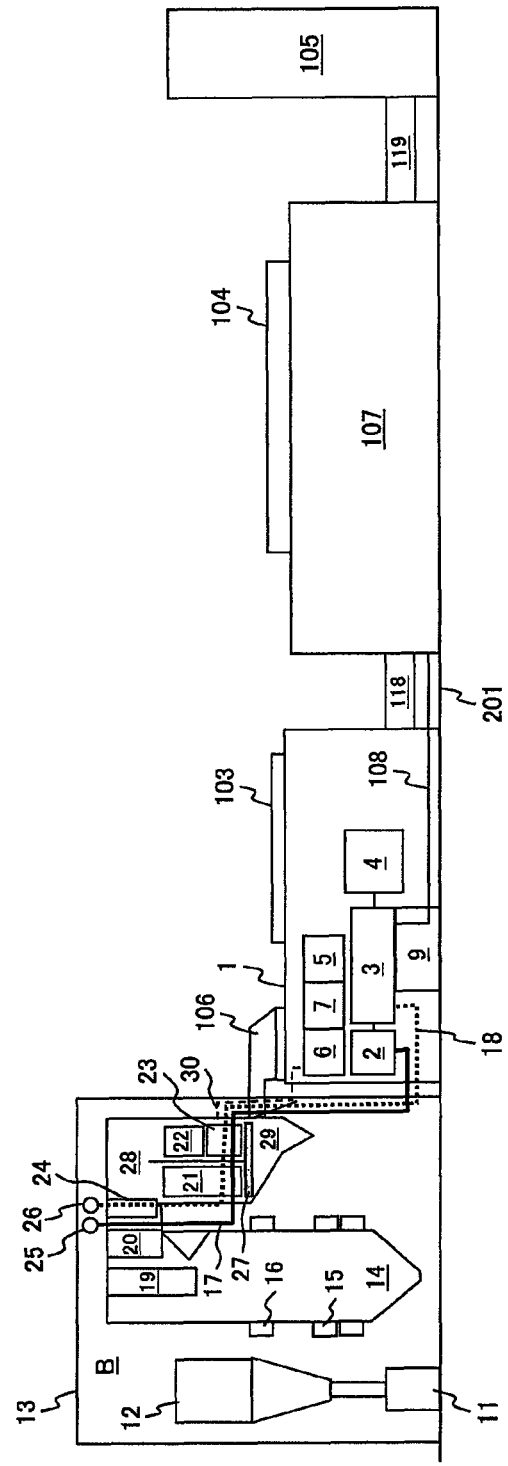

THERMAL POWER PLANT

CLAIM OF PRIORITY

The present application claims priority from Japanese patent application serial No. 2010-240209 filed on Oct. 27, 2010, the content of which is hereby incorporated by reference into this application

BACKGROUND OF THE INVENTION

1. Field of the Invention

The present invention relates to a thermal power plant in which arrangement and structure of plant components are improved, and particularly to a thermal power plant including a 2 pass-type boiler having a low-rise structure in which a furnace and a rear heat recovery area are continuously arranged in parallel.

2. Description of the Related Art

Thermal power plants including a 2 pass-type boiler are widely used because these plants have a higher earthquake-resistance strength and can be constructed with lower cost in comparison with thermal power plants including a tower-type boiler. In the thermal power plants using a 2 pass type boiler, fuel and air are burned within a boiler, and water is heated by the generated heat to generate steam, which drives steam turbines for power generation. Additionally, they are provided with an air quality control system (AQCS) to purify combustion gas generated by the combustion.

The thermal power plants can use many kinds of fuel, but have a lower efficiency and generate a larger amount of emission of carbon dioxide in comparison with gas turbine combined cycle generators. Then, the efficiency is improved by high temperature and high pressure of steam. However, materials of main steam pipes etc. of thermal power plants, the materials withstanding a high temperature of about 700 degrees Celsius and high pressure of steam, are much more expensive in comparison with typical plant materials. Therefore, it is necessary to minimize an amount of materials used for the high temperature sections.

Conventionally, as described in JP-A No. 2010-43562, an idea that a boiler is buried underground and a main steam pipe that connects the boiler and a steam turbine is reduced in length has been proposed. Additionally, as shown in JP-U No. 64-51704, a 2 output unit type thermal power plant installable even in a small site because a flue and a chimney are arranged along and next to the line of a turbine building and a boiler is disclosed.

In the technology of JP-A No. 2010-43562, when the boiler is buried underground, the construction cost rises, and an additional facility is required to control heat of the boiler. Additionally, JP-U No. 64-51704 discusses an idea about the overall arrangement of a thermal power plant but does not discuss a length of the main steam pipe etc.

The present invention proposes a thermal power plant for achieving high reliability, low material cost, and low construction cost by devising arrangement and structure of a boiler, a steam turbine, and a flue gas treatment apparatus to reduce an amount of a high-temperature resistance material used for a main steam pipe etc. and further by reducing a length and thermal elongation of piping of the main steam pipe etc.

SUMMARY OF THE INVENTION

The present invention is a thermal power plant including: a boiler having a 2 pass structure in which a furnace for burning fuel and a rear heat recovery area for recovering heat from exhausted combustion gas are arranged in parallel; a steam generator for heating water by use of heat recovered from the furnace and the rear heat recovery area of the boiler to generate steam; and a generator for rotating steam turbines including at least a high-pressure turbine by use of generated steam to convert rotational energy to electricity. In the thermal power plant, the high-pressure turbine of the steam turbines is arranged near the rear heat recovery area of the boiler.

Additionally, the thermal power plant includes a boiler building for housing the furnace of the boiler and the rear heat recovery area and a turbine building for housing the steam turbines. The turbine building is arranged near the side of the rear heat recovery area of the boiler building.

Additionally, in the thermal power plant, a connection duct is installed on the turbine building to change a direction of combustion gas of the rear heat recovery area generally perpendicularly to a direction of a central axis of the boiler, the combustion gas being exhausted in the direction of the central axis of the boiler, the central axis connecting the furnace and the rear heat recovery area, and a DeNOx for supplying the combustion gas after coming out of the connection duct is provided downstream of the connection duct.

Additionally, in the thermal power plant, the central axis of the boiler and axes of the steam turbines are coincident in direction on the installation plane of the thermal power plant, the central axis connecting the furnace and the rear heat recovery area.

Additionally, in the thermal power plant, a turbine building for housing the steam turbines is provided, an outlet of the rear heat recovery area of the boiler is divided, the turbine building and a flue gas treatment apparatus are arranged to outlets of the rear heat recovery area and arranged in parallel on the installation plane of the thermal power plant, and the axes of the steam turbines and a flow of the combustion gas within the flue gas treatment apparatus are in the same direction.

Additionally, in the thermal power plant, a header for correcting steam is provided on the furnace or on the rear heat recovery area, two steam pipes are provided for supplying steam which has come out of the header to the steam turbines, and the two steam pipes are respectively provided to opposite sides of the central axis of the boiler and axes of the steam turbines on the installation plane of the thermal power plant.

Additionally, in the thermal power plant, two steam pipes are provided for supplying steam which has come out of the boiler to the steam turbines, and the two steam pipes are respectively provided to opposite sides of the central axis of the boiler and axes of the steam turbines on the installation plane of the thermal power plant.

Additionally, in the thermal power plant, combustion gas is exhausted from the rear heat recovery area of the boiler in the direction of the central axis of the boiler, a turbine building for housing the steam turbines is provided, and a DeNOx for removing nitrogen oxide in the combustion gas is provided on the turbine building downstream of the rear heat recovery area.

Additionally, in the thermal power plant, combustion gas is exhausted from the rear heat recovery area of the boiler in the direction of the central axis of the boiler, the turbine building for housing the steam turbines is provided, and the DeNox for removing nitrogen oxide in the combustion gas and an air heater for heating air are provided on the turbine building downstream of the rear heat recovery area.

Further, in the thermal power plant, combustion gas exhausted from the rear heat recovery area of the boiler is exhausted generally perpendicularly to a direction of the central axis of the boiler, the central axis connecting the furnace and the rear heat recovery area of the boiler on the installation plane of the thermal power plant.

Additionally, in the thermal power plant, combustion gas exhausted from the rear heat recovery area of the boiler is exhausted from two portions, the two portions being perpendicular to and on opposite sides of the central axis of the boiler, the central axis connecting the furnace and the rear heat recovery area of the boiler on the installation plane of the thermal power plant.

Further, in the thermal power plant, the DeNOx for removing nitrogen oxide of combustion gas is provided downstream of the rear heat recovery area of the boiler, an economizer for heating water is provided to the rear heat recovery area, bypass ducts for drawing part of the combustion gas are attached upstream of the economizer to avoid reduction of a gas temperature of the DeNox, and drawn-out directions of the bypass ducts are generally perpendicular to the direction of the central axis of the boiler.

In the thermal power plant, the DeNOx for removing nitrogen oxide of combustion gas is provided downstream of the rear heat recovery area of the boiler, the economizer for heating water is provided to the rear heat recovery area, the bypass ducts for drawing part of combustion gas are attached upstream of the economizer to avoid reduction of a gas temperature of the DeNox, and drawn-out directions of the bypass ducts are generally in parallel to the direction of the central axis of the boiler.

Further in the thermal power plant, two DeNOxes for removing nitrogen oxide of combustion gas, two air heaters for heating air by use of the combustion gas, and two precipitators for removing ashes of the combustion gas are provided, and combustion gas exhausted from the rear heat recovery area of the boiler is exhausted from one side surface of the rear heat recovery area, branched into two, and supplied to the two DeNOxes, the two air heaters, and the two precipitators.

Further in the thermal power plant, a $CO_2$ recovery apparatus for separating and recovering $CO_2$ of combustion gas exhausted from the rear heat recovery area of the boiler is provided downstream of the boiler, and the $CO_2$ recovery apparatus is installed near the steam turbines.

Further, in the thermal power plant, steam is used for the $CO_2$ recovery apparatus, and part of the $CO_2$ recovery apparatus is installed below the steam turbines.

Further, the thermal power plant includes: the air heater; an air separation unit; a duct for circulating part of the combustion gas; a mixer for oxygen produced in the air separation unit and the circulated combustion gas; and a duct for supplying mixed oxygen gas to the air heater. The combustion gas of the rear heat recovery area of the boiler building which houses the boiler having the furnace and the rear heat recovery area is exhausted in one direction generally perpendicular to a direction of the central axis of the boiler, the central axis connecting the furnace and the rear heat recovery area on the installation plane of the thermal power plant. The air separation unit is provided on the combustion gas exhaust side of the boiler building.

Further, in the thermal power plant, a two-stage reheat type turbine is used as a steam turbine.

According to the present invention, a thermal power plant includes: a steam generator for generating steam by use of heat recovered from a boiler having a 2 pass structure in which a furnace and a rear heat recovery area are continuously arranged in parallel; and a generator for rotating steam turbines including at least a high-pressure turbine by use of generated steam to generate electricity. The high-pressure turbine of the steam turbines is arranged near the rear heat recovery area of the boiler. Accordingly, main steam pipes of the thermal power plant are shortened for enabling reduction of construction cost and material cost, and thermal elongation is reduced for enabling its long life and improved reliability.

Additionally, manufacturing cost can be reduced by reducing bends of the main steam pipes. Further, routing of the main steam pipes becomes easy to enable reduction of the design time. Further, since the main steam pipes do not pass near the other apparatuses, the installation of the main steam pipes and the installation of the apparatuses can be conducted simultaneously, and thus the construction time can be reduced.

BRIEF DESCRIPTION OF THE DRAWINGS

FIG. 4B is a front view showing the arrangement of Embodiment 2 of the present invention.

FIG. 6A is a top view showing the arrangement of Embodiment 4 of the present invention.

FIG. 13B is a front view showing the arrangement of Embodiment 11 of the present invention.

DETAILED DESCRIPTION OF THE PREFERRED EMBODIMENTS

Hereinafter, embodiments of the present invention are explained in reference to the drawings.

[Embodiment]1
[Basic Structure]

Figure 1A:
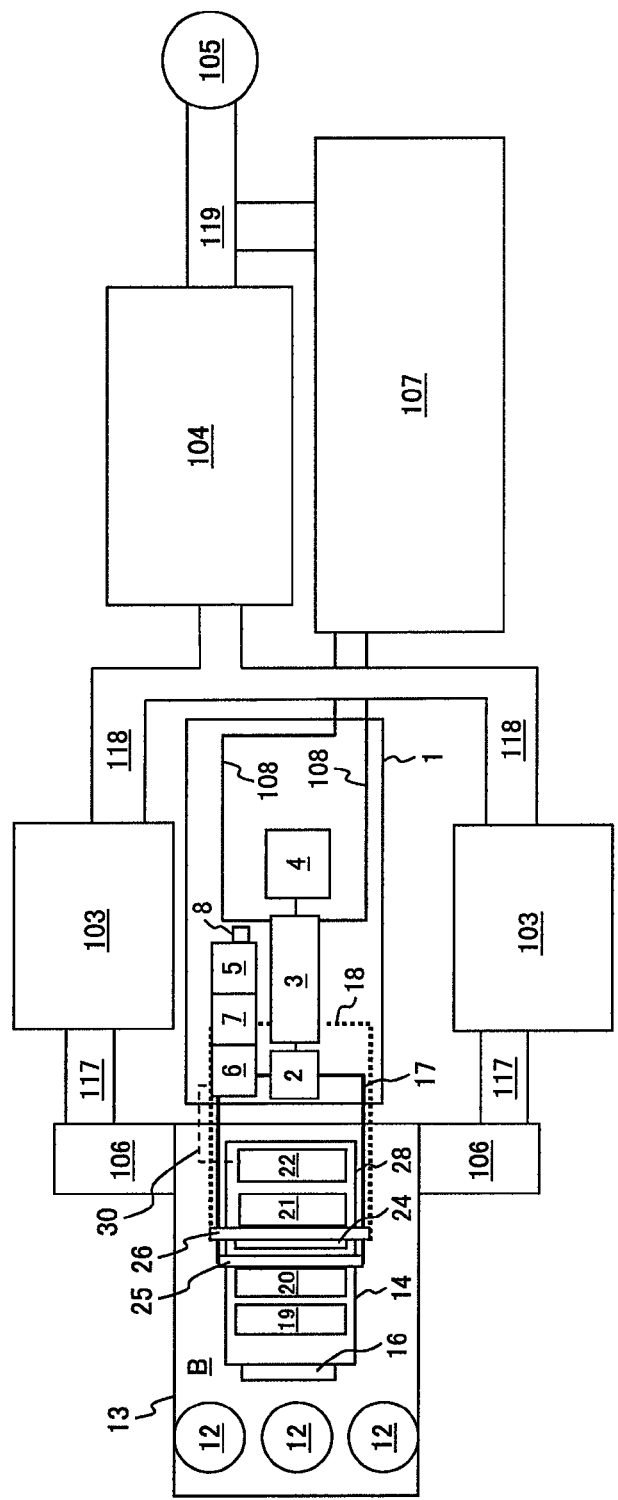
FIG. 1A is a top view showing arrangement of Embodiment 1 of the present invention.
Figure 1B:
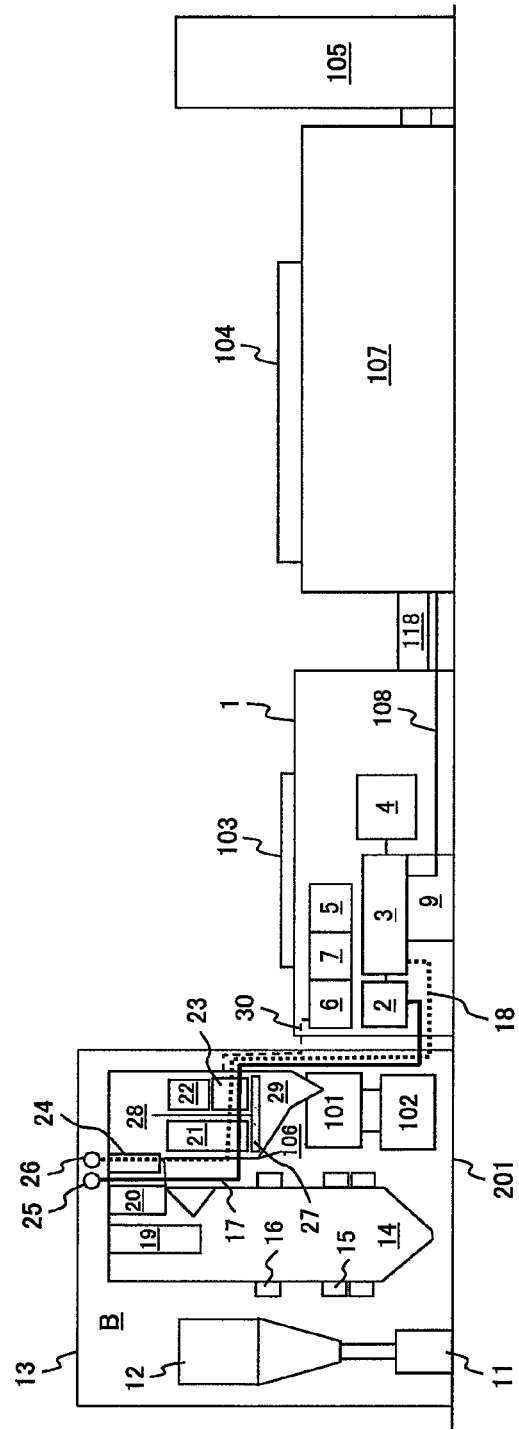
FIG. 1B is a front view showing the arrangement of Embodiment 1 of the present invention.
Figure 1C:
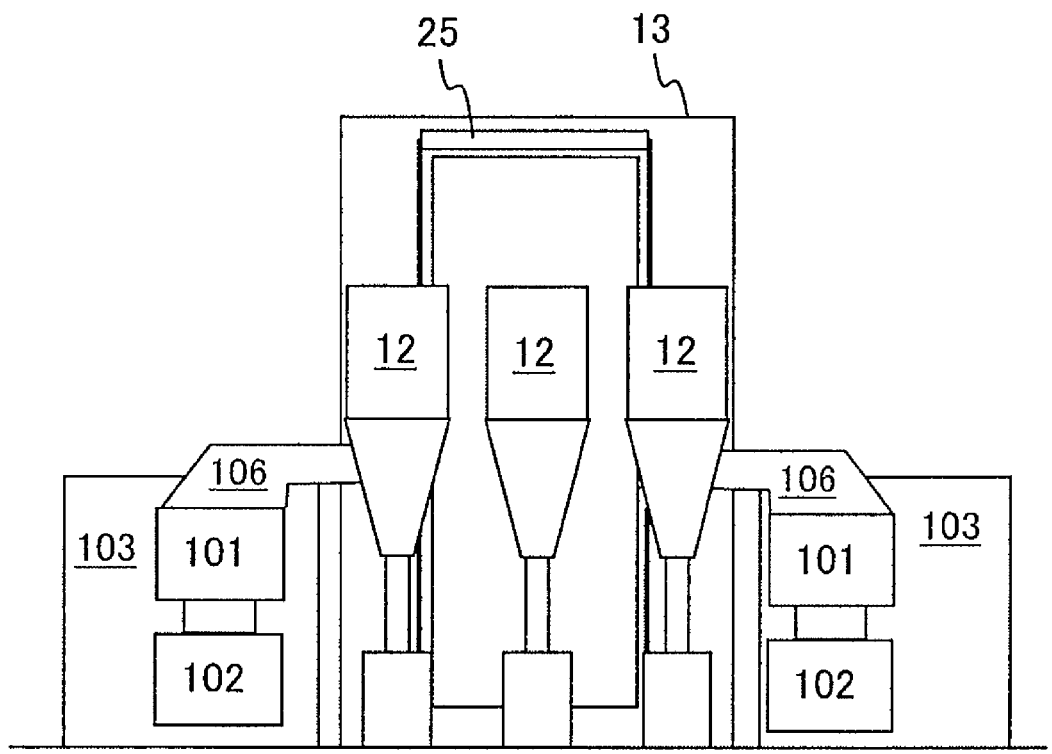
FIG. 1C is a side view showing the arrangement of Embodiment 1 of the present invention.

FIGS. 1A to 1C show arrangement of Embodiment 1 of a thermal power plant. A feature of Embodiment 1 is that a turbine building 1 is arranged on the side of an air quality control system (AQCS) of a boiler building 13. That is, a boiler B having a furnace 14 and a rear heat recovery area 28 are provided in the boiler building 13. The furnace 14, rear heat recovery area 28, and steam turbine building 1 are arranged in this order. Embodiment 1 shows the case where coal is used as fuel, and is applicable also to the case where oil, biomass, gas, petroleum coke, etc. are used.

Hereinafter, a combustion system and a flue gas treatment system are explained first, and next a water and steam system is explained.

[Combustion System]

First, in the combustion system, coal supplied to coal silos 12 is pulverized by a coal pulverizer 11, passes through coal supply lines (not shown), and is supplied from a burner 15 to the furnace 14. Air is drawn by a fan (not shown) installed in the boiler building 13, and supplied to the burner 15 and an over firing airport (OFA) 16 via an air heater 102. The air flows through an air duct (not shown) installed in the boiler building 13. The OFA 16 is not indispensable. NOx (nitrogen oxide) can be reduced by supplying air through two stages, the burner 15 and the OFA 16.

The furnace 14 includes a water pipe and transfers heat generated by combustion to water or steam flowing through the water tube. Heat of combustion gas is transferred to steam which flows through a first pendant super heater 19, a second pendant super heater 20, and a pendant reheater 24. Although two pendant super heaters are installed in Embodiment 1, they may be three or more.

Further, the combustion gas passes through a rear heat recovery area 28 of the boiler B. Heat exchangers such as a reheater 21, a super heater 22, and an economizer 23 are installed in the rear heat recovery area 28. The arrangement shown here is one example. The optimal arrangement of heat exchangers differs according to a heat cycle, steam temperature, and gas temperature conditions. A Parallel damper 27 is installed downstream of the heat exchangers of the rear heat recovery area 28. The parallel damper 27 is used to adjust a gas flow amounts of the reheat steam system and main steam system and to control temperature of the main steam and reheat steam. An ash hopper 29 for receiving ashes is installed below the parallel damper 27.

[Flue Gas Treatment System]

Next, in the flue gas treatment system, combustion gas (flue gas) which has passed through the rear heat recovery area 28 is supplied to a DeNOx 101 of the boiler building 13 through communication ducts 106. In Embodiment 1, since the turbine building 1 is installed on the side of an air quality control system (AQCS) of the boiler building 13, the communication ducts 106 cannot be drawn out of the boiler building 13 toward a flue gas treatment system directly. Then, the communication ducts 106 are attached to the side walls of the boiler building 13. That is, the combustion gas is drawn out of the right and left side walls of the rear heat recovery area 28 through a pair of the right and left communication ducts 106. In this case, when the exit areas to the communication ducts 106 are small, the flow speed becomes high, the pressure drop becomes large, and vibration of the ducts 106 is also generated. On the other hand, when the exit area to the rear heat recovery area 28 is set large to make a flow rate small (for example, 20 m/s or less), the efficiency of the plant is improved, the vibration is not generated, and thus failures are reduced.

NOx in the combustion gas is removed by the DeNOx 101. The selective catalytic reduction method may be used as denitration. In this denitration, ammonia and NOx are reacted using a catalyst, and the suitable gas temperature has been determined.

Figure 2A:
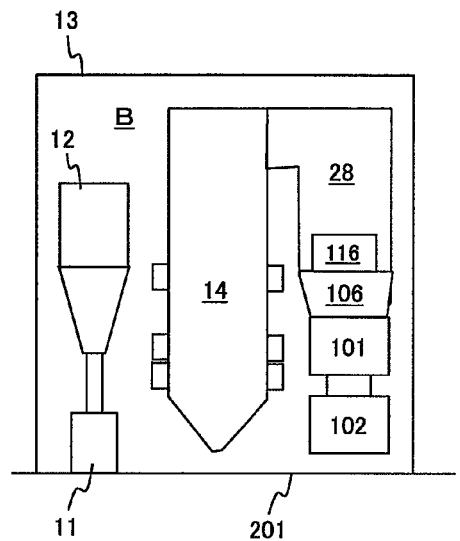
FIG. 2A is a front view showing arrangement of the modification of Embodiment 1 of the present invention.
Figure 2B:
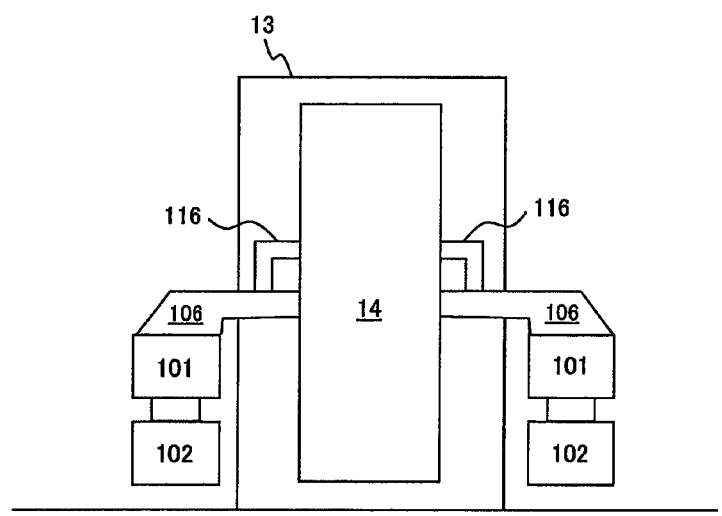
FIG. 2B is a side view showing arrangement of a modification of Embodiment 1 of the present invention.
Figure 3A:
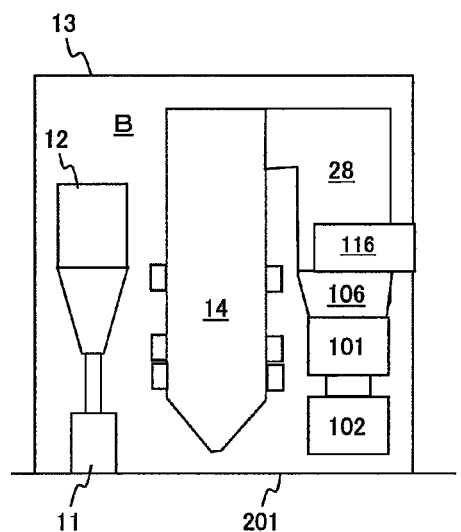
FIG. 3A is a front view showing arrangement of another modification of Embodiment 1 of the present invention.
Figure 3B:
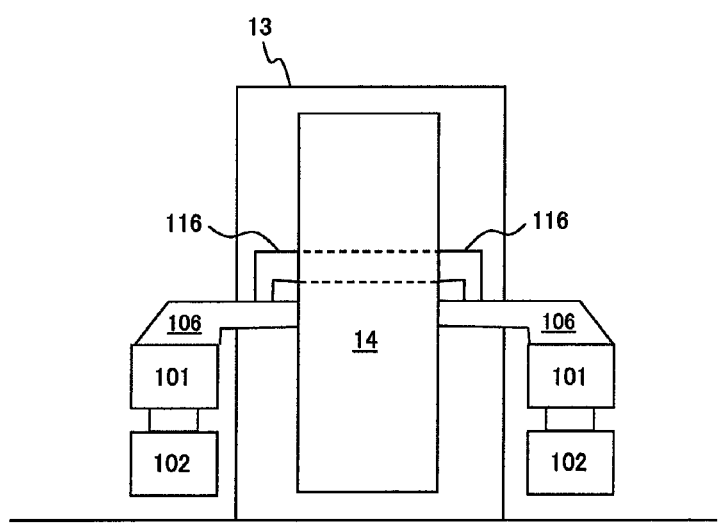
FIG. 3B is a side view showing the arrangement of another modification of Embodiment 1 of the present invention.

When the load on the plant is low, the gas temperature of the DeNOx is low, and NOx may be unable to be removed. Therefore, bypass ducts for bypassing the heat exchanger to flow part of the combustion gas is installed. FIGS. 2A and 2B show an application when bypass ducts 116 are installed. In this case, the combustion gas is exhausted from the side walls of the rear heat recovery area 28, the bypass ducts 116 bypass some of the heat exchangers (the super heater 21, economizer 23, etc.), and are connected with the communication ducts 106. At this time, cross section areas of the inlets (portions connected to the rear heat recovery area 28) of the bypass ducts 116 may become small. In such a case, as shown in the application of FIG. 3, the combustion gas is once removed from an opposite side of the rear heat recovery area 28 to the furnace, and connected to the communication ducts 106 by use of the bypass ducts 116.

The combustion gas which has passed through the DeNOx 101 is supplied to the air heater 102, in which heat is exchanged between air and the combustion gas to heat air for recovery of heat energy. Thus, a temperature of the combustion gas is reduced. As the air heater, a Ljungstrom type, a shell and tube type, etc. are usable.

The combustion gas after coming out of the air heater 102 passes through an electrostatic precipitator (ESP) 103. Thus, unburned components and ashes contained in the combustion gas are removed. A desulfurization apparatus 104 removes sulfur oxides in the combustion gas. In Embodiment 1, two DeNOxes 101, two air heaters 102, and two electrostatic precipitators 103 are used. Also, one DeNOx 101, one air heater 102, and one electrostatic precipitator 103 may be used instead of above two DeNOxes and so on. In this case, since the steam turbines are not surrounded by the flue gas treatment system, installation and maintenance of the steam turbines become easy.

In Embodiment 1, a chimney 105 and a $CO_2$ recovery apparatus 107 is installed downstream of the desulfurization apparatus 104. Although the $CO_2$ recovery apparatus is not indispensable in the present invention, the effectiveness is high when the $CO_2$ recovery apparatus is installed. A flow amount of the combustion gas which flows into the chimney 105 and $CO_2$ recovery apparatus 107 can be adjusted by a damper (not shown) installed in the duct. When $CO_2$ is recovered, a flow amount which flows into the $CO_2$ recovery apparatus 107 is increased.

In the recovery of $CO_2$, a chemical absorption method recovers $CO_2$ by use of an absorbent solvent such as amine. It is necessary to heat the absorbent solvent to separate $CO_2$ from the absorbent solvent. As a heat source for the heating, steam such as high pressure steam, reheat steam, and bled steam can be considered. Since high pressure steam is suitable for rotating a turbine, reheat steam and bled steam may be used for the heating.

In Embodiment 1, since the $CO_2$ recovery apparatus 107 and steam turbine building 1 are adjacent, a length of the steam piping can be shortened. Accordingly, in addition to cost reduction, improvement in reliability by reduction of thermal elongation and improvement in efficiency by reduction of thermal loss can be implemented.

[Water and Steam System]

Further, a water and steam system is explained. The water supplied from the condenser passes through a condensate pump (not shown), a low pressure feed water heater 5, a deaerator 7, a feed pump 8, and a high pressure feed water heater 6, and is supplied to the boiler B through a feed water pipe 30. The order in which water passes through these apparatuses and their positions in the turbine building 1 change in accordance with an adopted steam cycle, an output, and a structure of steam turbines. In Embodiment 1, the high pressure feed water heater 6 and economizer 23 are provided very close to one another, and a length of the feed water pipe 30 can be shortened. Accordingly, the material cost and installation cost are reduced and reliability of the apparatuses is improved according to small thermal elongation. In Embodiment 1, only one feed water pipe is installed, but two feed water pipes may be provided.

Water is supplied to the economizer 23 through the feed water pipe 30. This system is called a main steam system. The water heated by the economizer 23 is supplied to the furnace 14 of the boiler B. Then, the water is heated in the furnace 14 and changed to steam by a steam generator explained below. The steam passes through the super heater 22 and passes through the first pendant super heater 19 and second pendant super heater 20. Headers are installed to the inlets and outlets of these heat exchangers. Not all the headers are shown. The headers distribute steam of the heat exchangers, and mix steam of the heat transfer pipes to equalize their temperatures. A connection duct (not shown) connects between the headers. A spray may be installed in the connection duct for adjustment of the steam temperature.

A main steam final header 25 is installed after a final super heater of the main steam system. The steam is collected by the main steam final header 25, and is supplied to the high-pressure turbine 2 through two main steam pipes 17. In the thermal power plant of Embodiment 1, axes of the main steam final header 25 and high-pressure turbine are perpendicular to one another on the installation plane of the thermal power plant when seen two-dimensionally. The two main steam pipes can be made symmetrical relative to the axis of the high-pressure turbine. Advantages of this structure are as follows.

(1) The design is easy.

(2) The right and left thermal elongations are uniform, so that non-uniform stresses are not generated on the right and left of the main steam final header 25, the main steam pipes 17, and the turbine.

(3) Thermal drops are made uniform in the right and left main steam pipes, so that the inlet temperatures of the high-pressure turbine 2 can be equal.

(4) The pressure drops are made equal in the right and left main steam pipes, so that the inlet pressures of the high-pressure turbine 2 can be made uniform.

The main steam pipes 17 can be shortened because the boiler building 13 and turbine building 1 are close to one another. Thus, the thermal elongations of the main steam pipes 17 are reduced, and the stresses generated on the apparatuses. Power generation efficiency of the plant is improved by raising temperature and pressure of steam. Piping materials corresponding to such a condition are very expensive. Therefore, as short lengths of pipes as possible are desirably installed. Thus, in Embodiment 1, lengths of the main steam pipes 17 can be made shorter than those of the past ones, so that the material cost can be reduced.

In the past arrangement, turbines are installed to the opposite side of the silos to the furnace, and the main steam pipes need to pass near the furnace. However, since many apparatuses such as coal supply lines, an air ducts, and silos are present around the furnace, it is difficult to pass the main steam pipe while bypassing these apparatuses. On the other hand, in Embodiment 1, the main steam pipes 17 pass near the rear heat recovery area 28 of the boiler building 13, around which few apparatuses are present to avoid the passage of the main steam pipes 17, and positions of the main steam pipes 17 can be determined freely. Additionally, since piping material corresponding to high temperature and high pressure conditions has high strength and is difficult to process, the bends of the piping material are minimized. In Embodiment 1, since positions of the main steam pipes can be determined freely, the bends of the piping material can be minimized. Thus, cost reduction and improvement in reliability can be accomplished.

Two main steam pipes are installed in Embodiment 1. It is also possible to integrate the main steam pipes into one pipe after coming out of the header. In this case, when the pipe is branched into two at the turbine inlets again, shapes of the turbine inlets can be made symmetrical.

In Embodiment 1, the turbine has a single axis structure in which the high-pressure turbine 2, an intermediate-pressure (IP) turbine 3, and a generator 4 are arranged in line. A two-axis structure also can provide a similar advantage. For example in this case, a high-pressure turbine and an intermediate-pressure turbine are arranged on one axis, and a low pressure turbine is arranged on another axis. Then, a generator may be installed to each axis. In this case, a central position of the header and central axes of the high-pressure turbine and intermediate-pressure turbine may be coaxial. Accordingly, symmetry of the steam pipes having high pressure and temperature can be made high, and the stresses of these pipes can be reduced.

The steam which has come out of the high-pressure turbine 2 is again heated by the boiler B, and this steam is called reheat steam. In Embodiment 1, the steam passes through the reheater 21 and the pendant reheater 24 and is raised in temperature. The parallel damper 27 is operated to adjust heat transfer distribution for the reheater 21 and the pendant reheater 24 and to adjust a temperature of the reheat steam. The outlet of the pendant reheater 24 is equipped with a reheat steam final header 26. The reheat steam is collected at the reheat steam final header 26, and is supplied to the intermediate-pressure turbine 3 through reheat steam pipes 18.

The reheat steam pipes 18 as well as the main steam pipes 17 can be symmetrically arranged to make their lengths the same. Thus, the same advantages as the main steam can be acquired. These advantages are as follows.

(1) The design is easy.

(2) The right and left thermal elongations are equal, and asymmetrical stresses are not generated on the reheat steam final header 26, the reheat steam pipes 18, and the turbine.

(3) Thermal losses can be made the same in the right and left reheat steam pipes to make the inlet temperatures of the intermediate turbine 3 the same.

(4) Pressure losses can be made the same in the right and left reheat steam pipes to make the inlet pressures of the intermediate turbine 3 the same.

Since the pressure of the reheat steam pipes 18 is lower than that of the main steam pipes 17, the density of the steam is low. To flow the same flow amount at the same flow rate, the diameter of the pipe needs to be larger. That is, the reheat steam pipes need a larger arrangement space than that of the main steam pipes. In Embodiment 1, since the reheat steam pipes pass near the rear heat recovery area having few apparatuses which interfere the passage of the reheat steam pipes, the design is easy. Like the main steam pipes, the reheat steam pipes 18 have short lengths, reducing the material cost. Further, the process cost can be reduced by reducing the number of the bends. The steam which has come out of the intermediate-pressure turbine is supplied to the condenser 9 and returned to water.

In construction of the thermal power plant, apparatuses are carried into the turbine building. These apparatuses may be removed and repaired in periodic checks of the thermal power plant. In such a case, as shown in FIG. 1, when the turbine building 1 is surrounded by a boiler building 106, the electrostatic precipitator 103, the desulfurization apparatus 104, and the $CO_2$ recovery apparatus 107, the carrying-in of the apparatuses is difficult. Then, for example, ducts 118 for connecting the desulfurization apparatus 104 and the electrostatic precipitator 103 may be installed at a height at which industrial vehicles such as tracks and trailers can pass. In this case, it is not necessary to make heights of all the ducts high, and the carrying-in of the apparatuses becomes easy when only one or two portions are made high.

[Embodiment]2

Figure 4A:
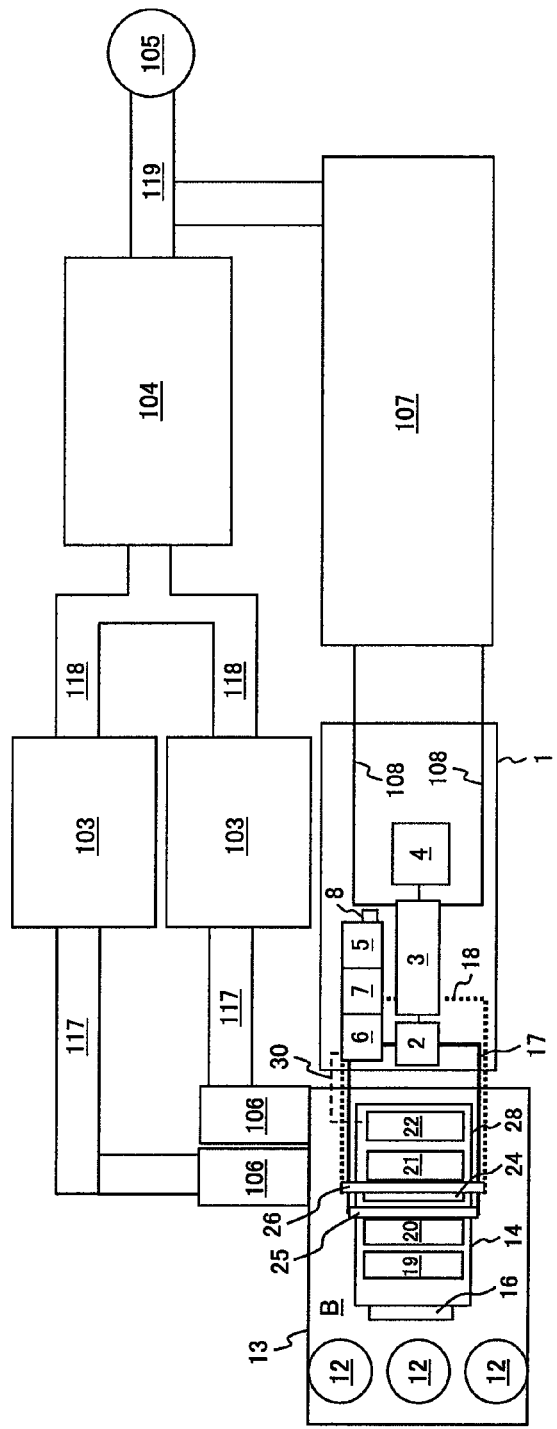
FIG. 4A is a top view showing arrangement of Embodiment 2 of the present invention.

FIGS. 4A and 4B show Embodiment 2 of the present invention. In Embodiment 2, flue gas treatment systems such as the electrostatic precipitator 103 and the desulfurization apparatus 104 are arranged to one side of the boiler building 13 and one side of the turbine building 1. The advantages of this arrangement are as follows.

(1) Since the turbine building is not surrounded by the flue gas treatment systems, the carrying-in of the apparatuses is easy.

(2) The maintenance is easy because the flue gas treatment systems are gathered.

(3) Since there is no communication duct 106 etc. in one side of the rear heat recovery area 28, the carrying of the apparatuses below the rear heat recovery area 28 is easy and an apparatus for removing ashes which accumulate in the ash hopper can be installed.

In this arrangement, the communication ducts 106 for drawing combustion gas from the rear heat recovery area 28 of the boiler B need to be installed on one side. Therefore, to ensure the exit areas to the communication ducts 106, the ash hopper 29 of the rear heat recovery area 28 may be moved downward, or the width (in the direction from the furnace to the rear heat recovery area 28) of the rear heat recovery area 28 may be made wide.

In Embodiment 2, since lengths of right and left ducts 117 differ from each other, a deviation of a gas flow amount may occur in the right and left ducts. Then, the flow amounts may be controlled to be equal by attaching a flowmeter to the ducts and by using a controller.

[Embodiment]3

Figure 5A:
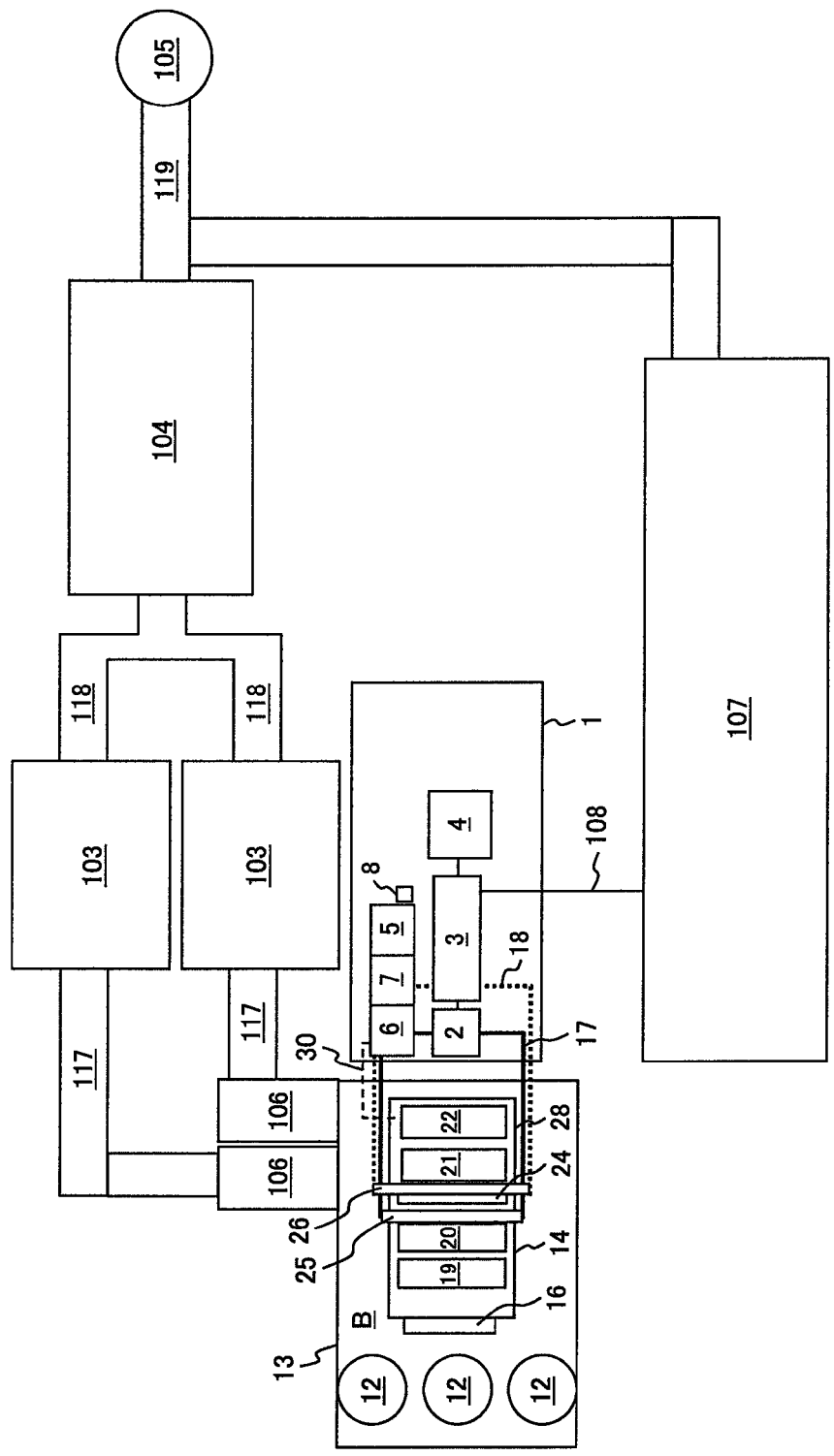
FIG. 5A is a top view showing arrangement of Embodiment 3 of the present invention.
Figure 5B:
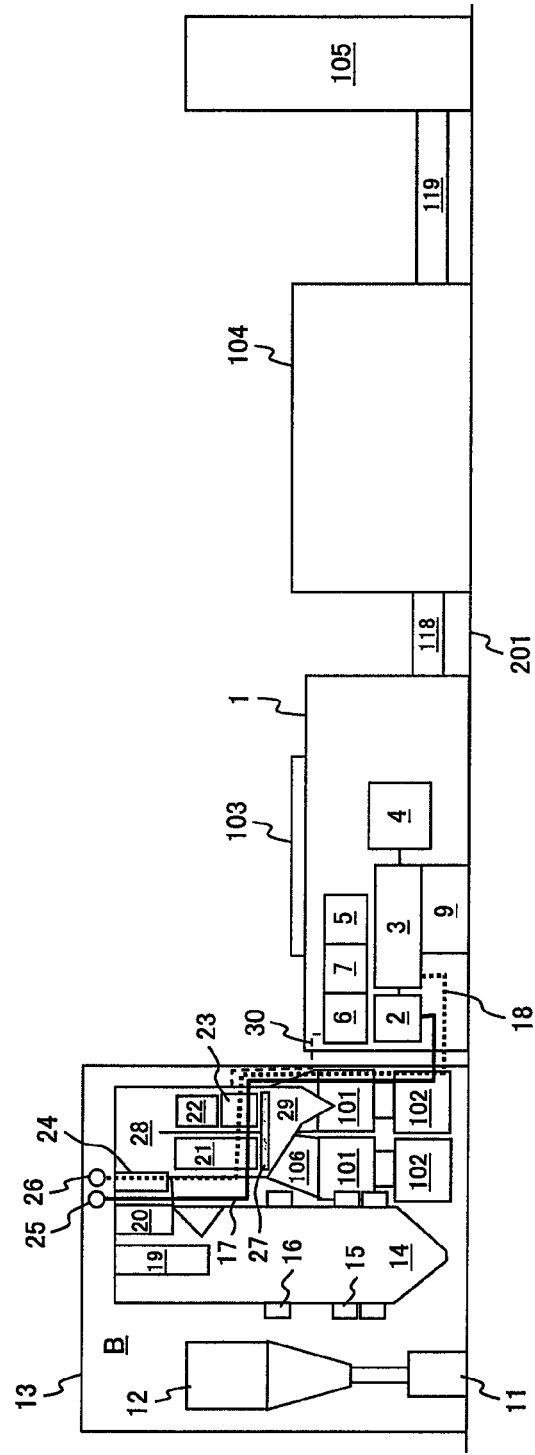
FIG. 5B is a front view showing the arrangement of Embodiment 3 of the present invention.

FIGS. 5A and 5B show Embodiment 3 of the present invention. FIGS. 5A and 5B show the same structure as FIG. 4 except a position of the $CO_2$ recovery apparatus 107. In using the chemical absorption method as the $CO_2$ recovery apparatus 107, a large amount of steam is used. For this reason, when steam pipes are long, heat dissipation increases to decrease the efficiency of the plant. In Embodiment 3, lengths of steam supplying pipes 108 for the $CO_2$ recovery apparatus are shortened by installing the $CO_2$ recovery apparatus 107 next to the turbine building 1. Further, a predetermined space is provided between the turbine building and the $CO_2$ recovery apparatus 107, and vehicles and equipment for the installation and repair are capable of entering this space.

[Embodiment]4

Figure 6B:
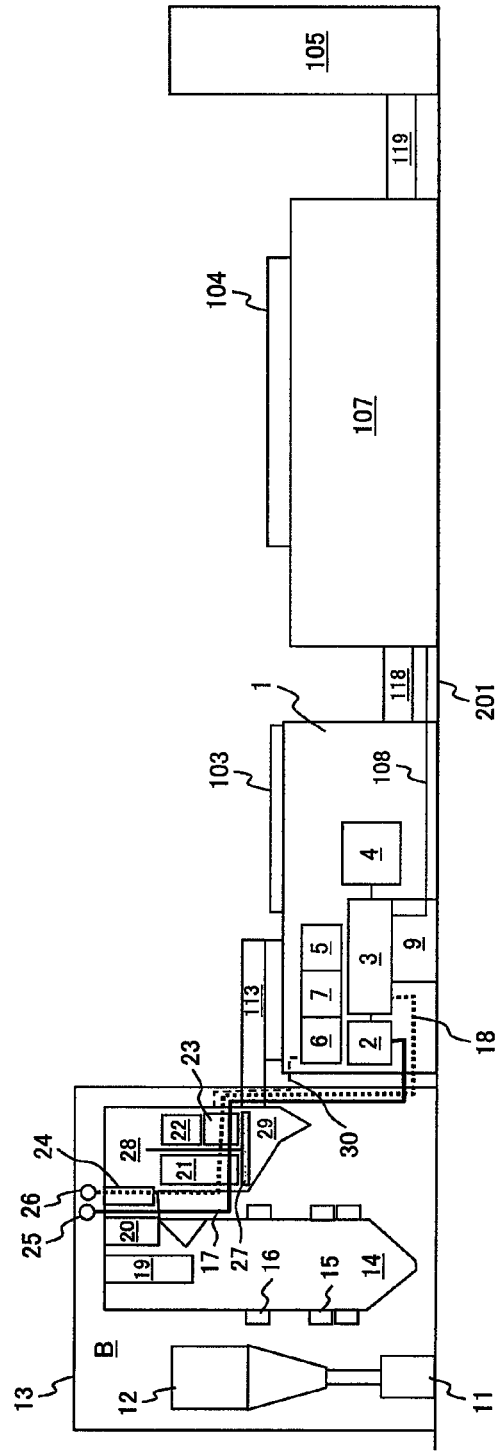
FIG. 6B is a front view showing the arrangement of Embodiment 4 of the present invention.
Figure 6C:
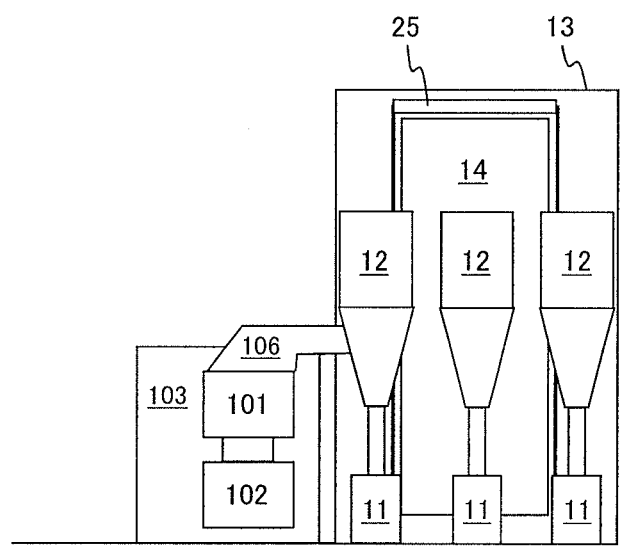
FIG. 6C is a side view showing the arrangement of Embodiment 4 of the present invention.

FIGS. 6A, 6B, and 6C show Embodiment 4 of the present invention. Combustion gas changes direction at a right angle, 90 degrees Celsius, above the turbine building by use of a connection duct 113, and further flows into the DeNOx 101 and air heater 102 through the communication ducts 106. A duct separating wall 114 is installed in the connection duct 113 to avoid a non-uniform flow when the combustion gas changes direction. By dividing the duct in such a way, flow separation is prevented and pressure drop can be reduced. That is, the power of a flue gas suction fan or a forced draft fan is reduced to improve the efficiency of the plant. To obtain the same advantageous effect, a guide vane for rectifying the flow may be installed in the connection duct 113. When the flow separation of is prevented, vibration of the duct can be reduced and the lives of the apparatuses can be made long.

In Embodiment 4, the width of the connection duct 113 is the same as the rear heat recovery area 28. Thus, the interface area for the rear heat recovery area 28 can be made large. That is, the pressure drop of the combustion gas flow can be reduced. Additionally, the exit shape of the rear heat recovery area 28 is the same as a conventional boiler, and a bypass duct can be installed easily, which is not shown here.

The connection duct 113 is installed on the turbine building 1, and combustion gas or ashes contained in the combustion gas may leak. For this reason, the structure in which the apparatuses are easily checked may be used. For example, as shown in FIG. 6, a clearance is provided between the roof of the turbine building and the connection duct to easily check the connection duct 113. In this case, the structure needs to have no problem in strength even when persons are on the roof of the turbine building. Since the connection duct 113 may be thermally elongated, an expansion for absorbing thermal elongation may be installed to the connection duct 113. To enhance the strength of the connection duct 113, a supporting post may be installed between the turbine building and connection duct 113. In this case, a structure for absorbing the elongation may be provided also to the supporting post.

Additionally, the connection duct 113 is arranged to be in contact with the turbine building 103, so that the structure can be simplified. In this case, since check is difficult, material having a high strength may be used.

In Embodiment 4, connection ducts 115 for supplying air from the boiler building 13 to the air heater 102 and returning the heated air are required. In Embodiment 4, two connection ducts 115 for the right and left of the flue gas treatment system are installed, and to shorten the lengths of the connection ducts, the connection ducts 115 are drawn from one side of the boiler building 13 and connected to the air heater 102.

[Embodiment]5

Figure 7A:
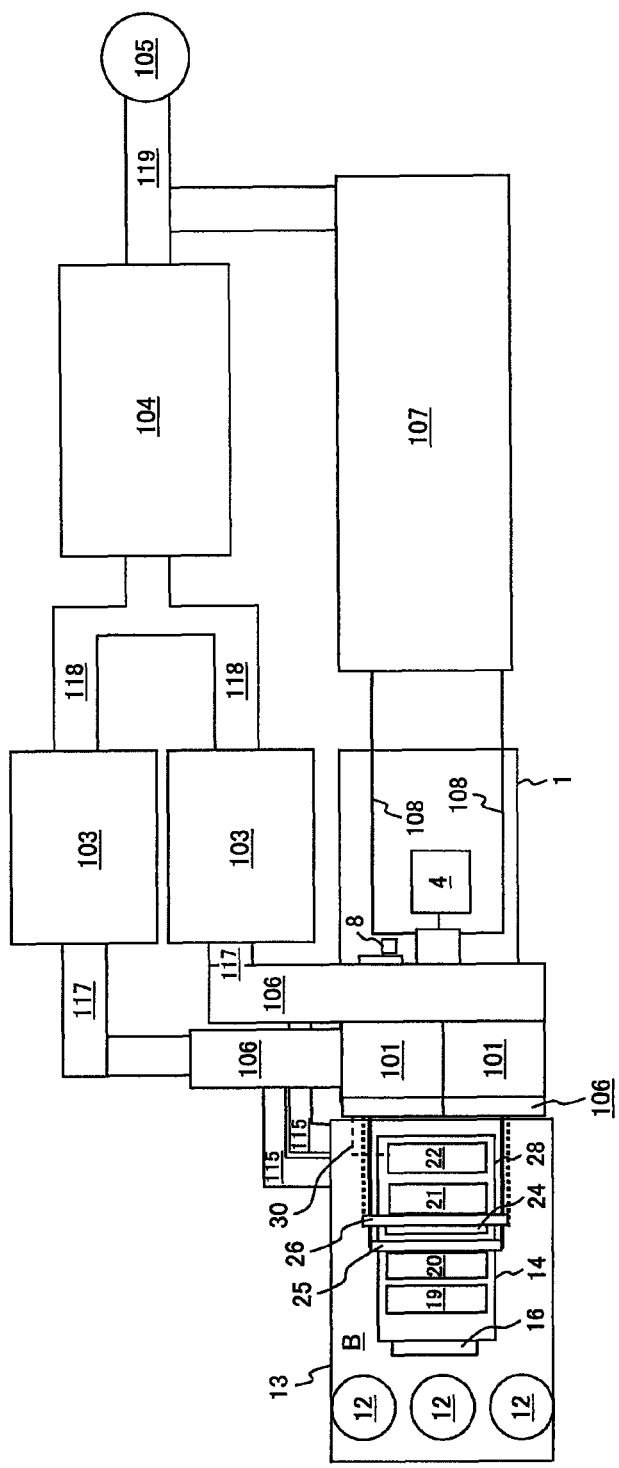
FIG. 7A is a top view showing arrangement of Embodiment 5 of the present invention.
Figure 7B:
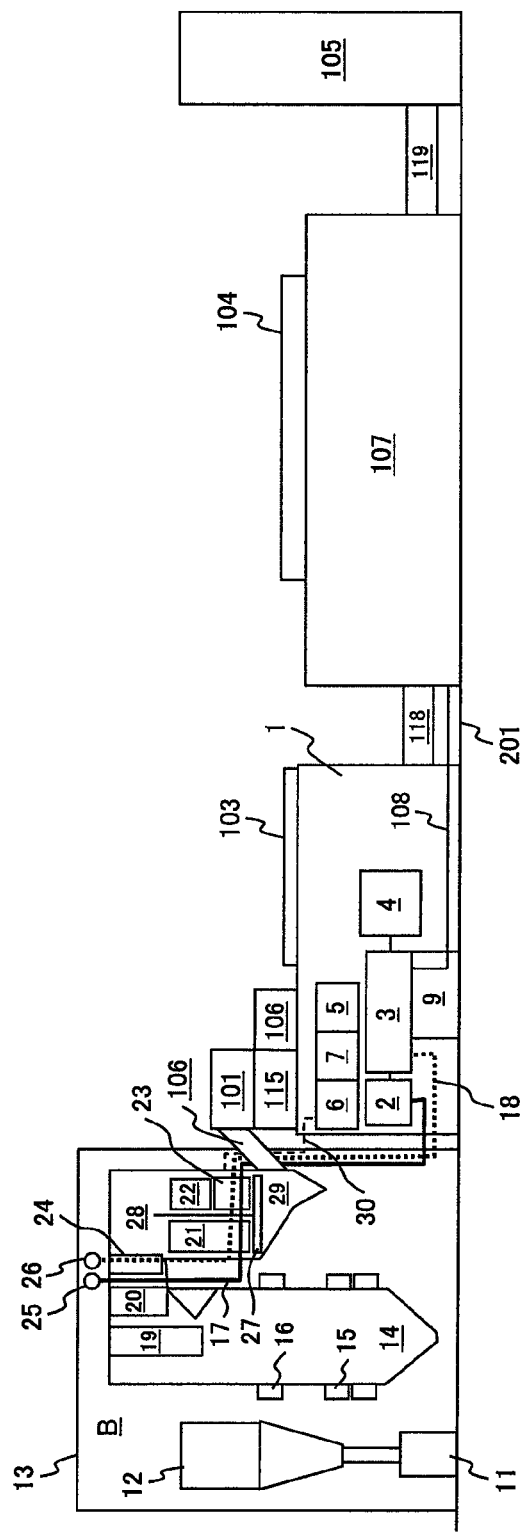
FIG. 7B is a front view showing the arrangement of Embodiment 5 of the present invention.

FIGS. 7A and 7B show Embodiment 5 of the present invention. Usually, a crane for hanging a very heavy turbine is installed to the turbine building 1. Therefore, the turbine building 1 is designed very strongly and thus even when the DeNOx 101 is installed on the turbine building 1, reinforcement in strength is rarely necessary. That is, a setting position of the DeNOx 101 can be ensured by low cost. Since the DeNOx uses ammonia, its leakage onto the turbine building is dangerous. Therefore, a sensor for checking leakage of ammonia may be installed on the turbine building 1 and near the DeNOx.

In Embodiment 5, combustion gas is supplied to the DeNOx 101 by use of the communication ducts 106. The connection ducts 115 and communication ducts 106 are used to supply the combustion gas which has come out of the DeNOx 101 to the air heater. Also in this case, a bypass duct may be installed to adjust a temperature of the gas supplied to the DeNOx.

[Embodiment]6

Figure 8:
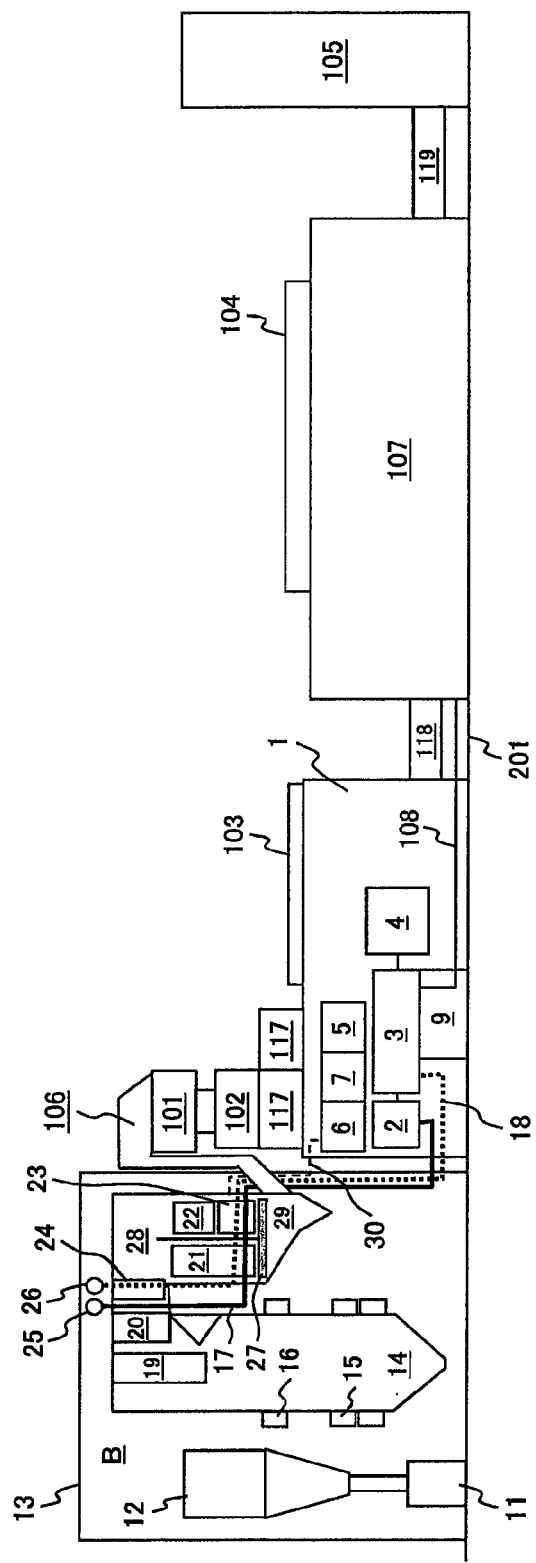
FIG. 8 is a front view showing arrangement of Embodiment 6 of the present invention.

FIG. 8 shows Embodiment 6 of the present invention. Embodiment 6 is similar to Embodiment 5, but has a property that, in addition to the DeNOx 101, the air heater 102 is installed on the turbine building. Thus, the site area where the apparatuses are arranged can be reduced. Further, since the gas temperatures of the ducts 117 for connecting the air heater 102 and electrostatic precipitator 103 are low, the amount of the thermal insulation material used for the ducts can be reduced.

[Embodiment]7

Figure 9A:
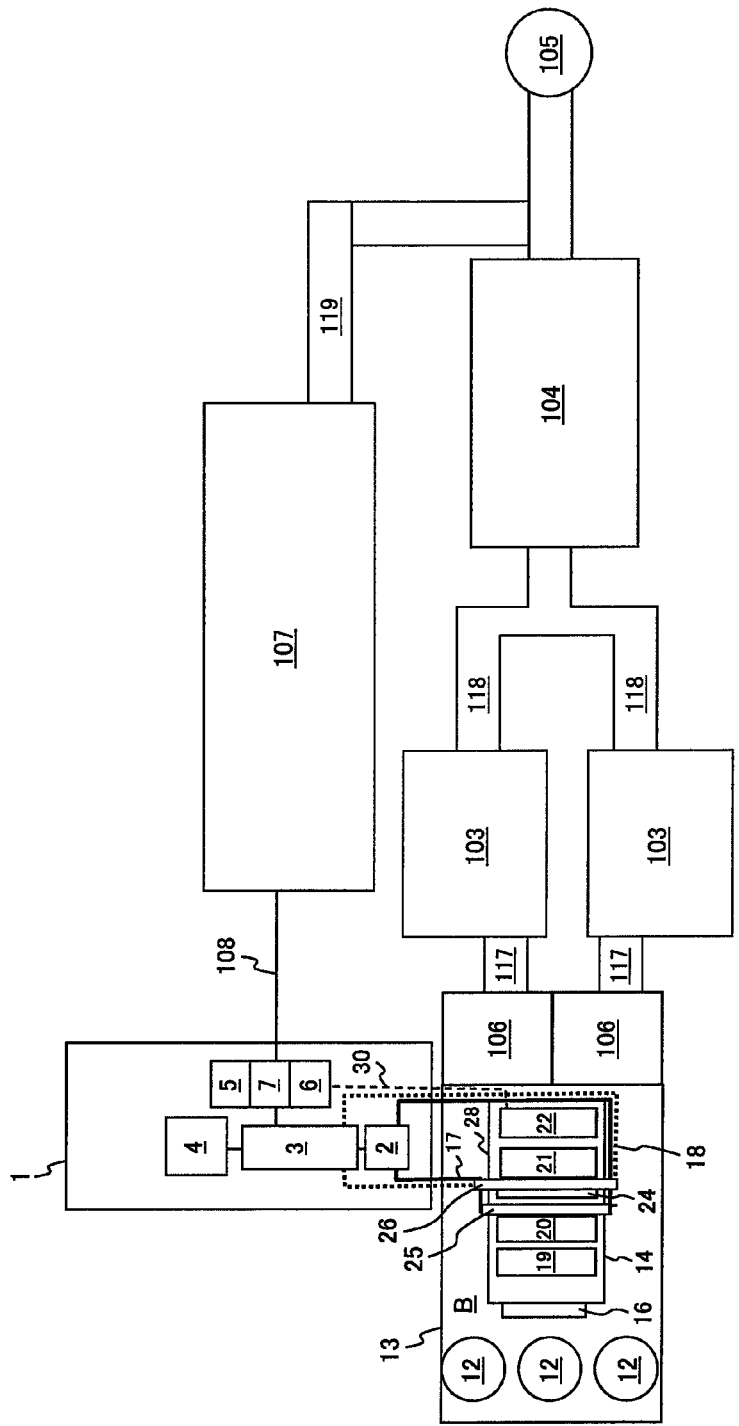
FIG. 9A is a top view showing arrangement of Embodiment 7 of the present invention.
Figure 9B:
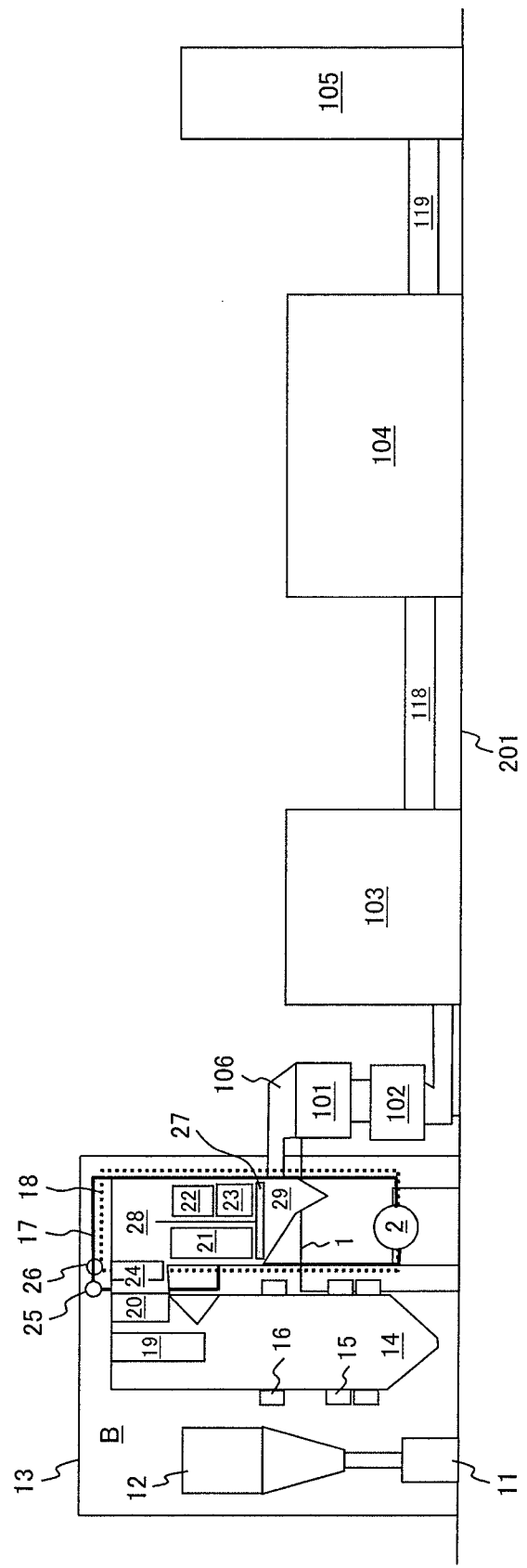
FIG. 9B is a front view showing the arrangement of Embodiment 7 of the present invention.

FIGS. 9A and 9B show Embodiment 7 of the present invention. Also in Embodiment 7, each equipment is arranged to shorten the lengths of the main steam pipes 17, reheat steam pipes 18, and feed water pipe 30. Particularly, the main steam pipes 17, having high temperature and pressure, need to be shortened in length. Therefore, the turbine building 1 is installed beside the rear heat recovery area 28 of the boiler building 13. In such a structure, the architecture of the flue gas treatment system can be made the same as the conventional ones. Additionally, the steam supply pipe 108 for connecting the $CO_2$ recovery apparatus 107 and turbine building 1 can be reduced in length. In this arrangement, the shaft of the turbines, the main steam final header 25, and the reheat steam final header 26 are in parallel.

[Embodiment]8

Figure 10A:
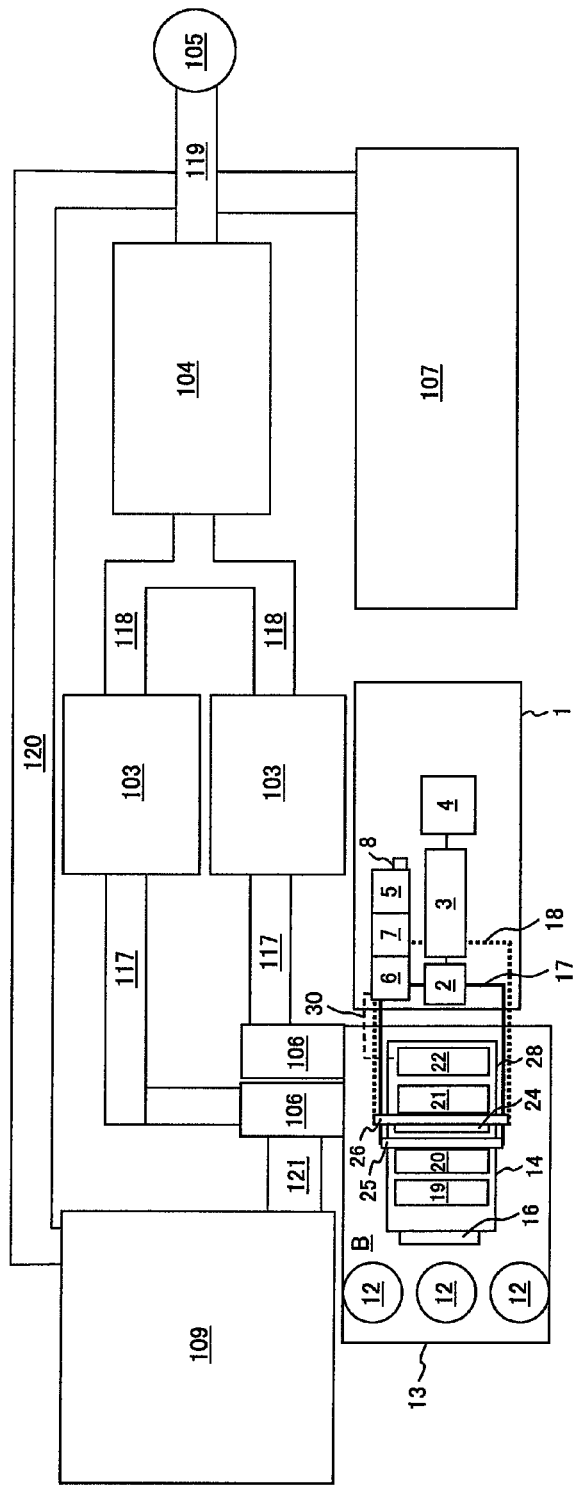
FIG. 10A is a top view showing arrangement of Embodiment 8 of the present invention.
Figure 10B:
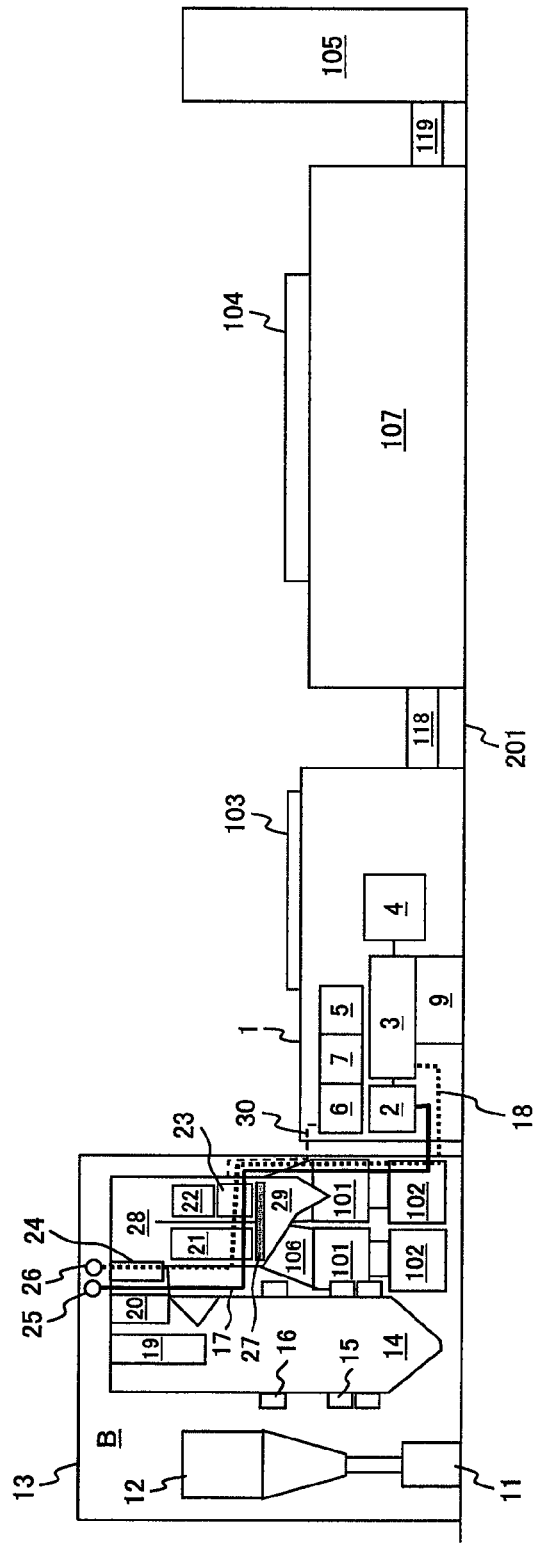
FIG. 10B is a front view showing the arrangement of Embodiment 8 of the present invention.

FIGS. 10A and 10B show the case where the oxy-fuel combustion method is used as the $CO_2$ recovery apparatus in Embodiment 8 of the present invention. Also in this case, the main steam pipe 17, reheat steam pipes 18, and feed water pipe 30 are made shorter than the conventional ones like in each above embodiment.

Oxygen is produced by an air separation unit (ASU) 109, mixed with the combustion gas mainly made of $CO_2$ introduced from the ducts 120, and supplied to the air heater 102 from a duct 121. The oxidizer, which is this mixed gas, is heated by the air heater 102, supplied from a burner 15 of the furnace 14 and the overfiring air port (OFA) 16, and used for fuel combustion. The combustion gas passes through the furnace 14, the rear heat recovery area 28, the DeNOx 101, the air heater 102, the ducts 117, the electrostatic precipitator 103, the desulfurization apparatus 104, and a duct 119, and is supplied to the $CO_2$ recovery apparatus 107.

In the oxy-fuel combustion method, since concentration of $CO_2$ supplied to the $CO_2$ recovery apparatus is dramatically as high as 80% or more, separation of $CO_2$ from gas such as nitrogen, oxygen, and moisture is easy. An advantage when the present invention is applied to the oxy-fuel combustion method is that since the air heater 102 is present on one side of the boiler building 13, the oxidizer in which the oxygen produced by the air separation unit 109 and the combustion gas are mixed is easily supplied to the air heater 102.

[Embodiment]9

Figure 11A:
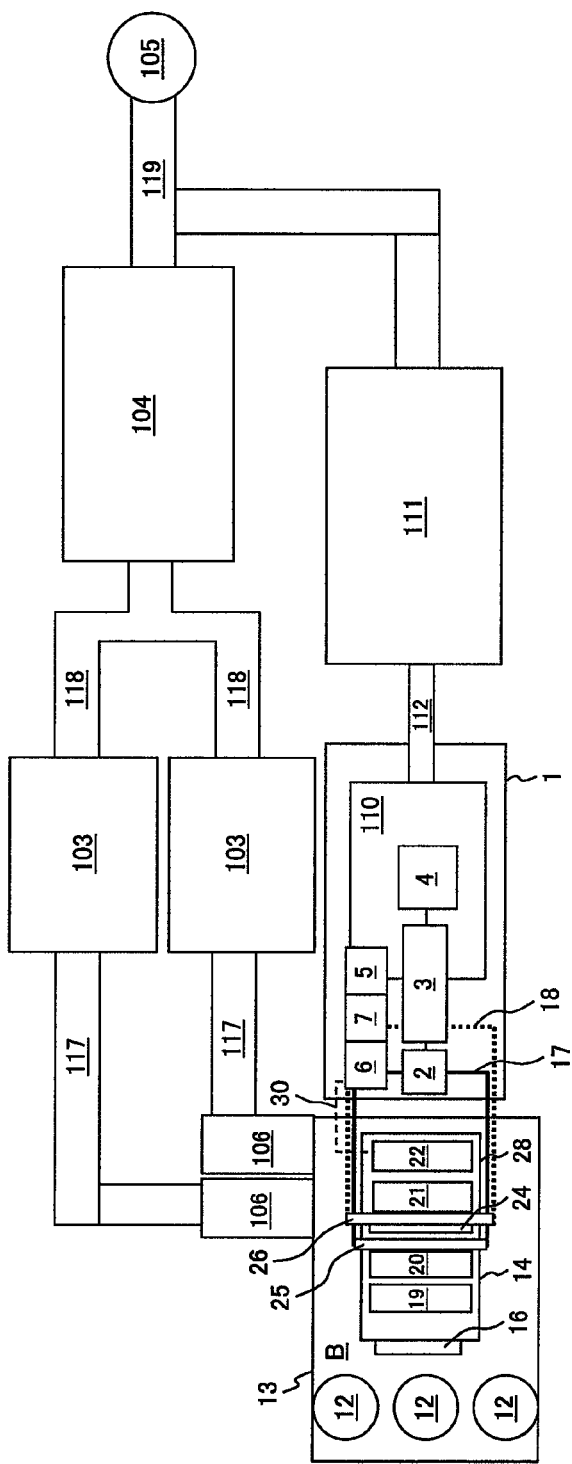
FIG. 11A is a top view showing arrangement of Embodiment 9 of the present invention.
Figure 11B:
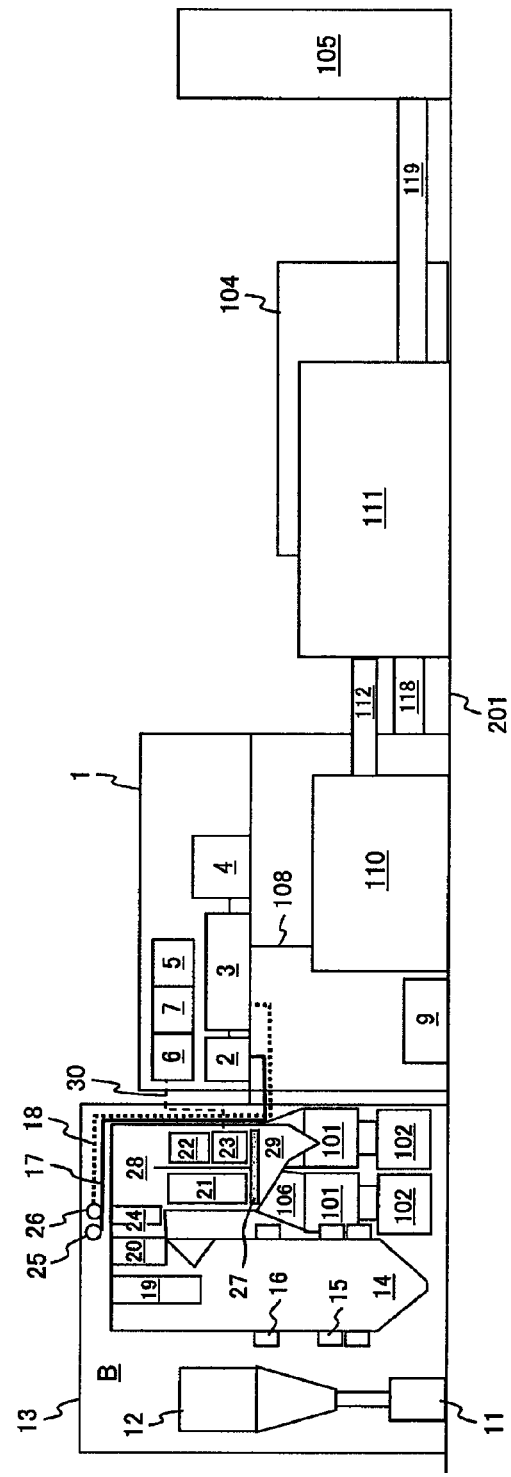
FIG. 11B is a front view showing the arrangement of Embodiment 9 of the present invention.

FIGS. 11A and 11B show Embodiment 9 of the present invention. In Embodiment 9, the turbine building 1 has a double decker structure. The condenser 9 and the $CO_2$ recovery apparatus 110 which uses heating by steam are installed in the first floor. The condenser 9 is installed on the first floor because a weight of the condenser 9 is heavy. The high-pressure turbine 2, the intermediate-pressure turbine 3, the generator 4, the deaerator 6, a low pressure feed water super heater 5, a high pressure feed water super heater 6, etc. are installed on the second floor. The distances among the main steam pipes 17, reheat steam pipes 18, and feed water pipe 30 can be shortened by installing the turbines at the high positions, and thus, the stress by the thermal elongation of the main piping can be reduced.

By installing the $CO_2$ recovery apparatus 110 which uses steam below the steam turbines, the length of the steam supplying pipes 108 for the $CO_2$ recovery apparatus can be shortened. The $CO_2$ recovery apparatus is divided into two. A $CO_2$ recovery liquid circulates through a $CO_2$ recovery liquid circulation duct 112 between a $CO_2$ recovery apparatus 111 which does not use steam, and the $CO_2$ recovery apparatus 110 which uses steam. The steam turbine building 1 is heightened to narrow the installation area of the $CO_2$ recovery apparatus 111, and thus the site for the plant can be used efficiently.

[Embodiment]10

Figure 12A:
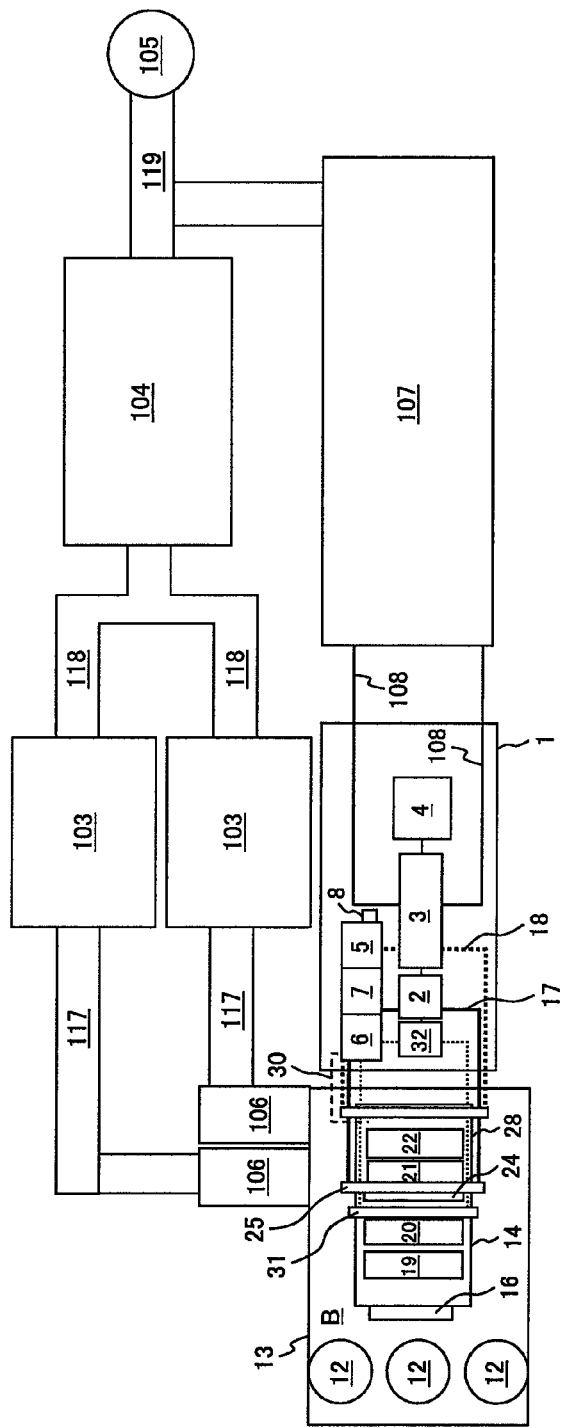
FIG. 12A is a top view showing arrangement of Embodiment 10 of the present invention.
Figure 12B:
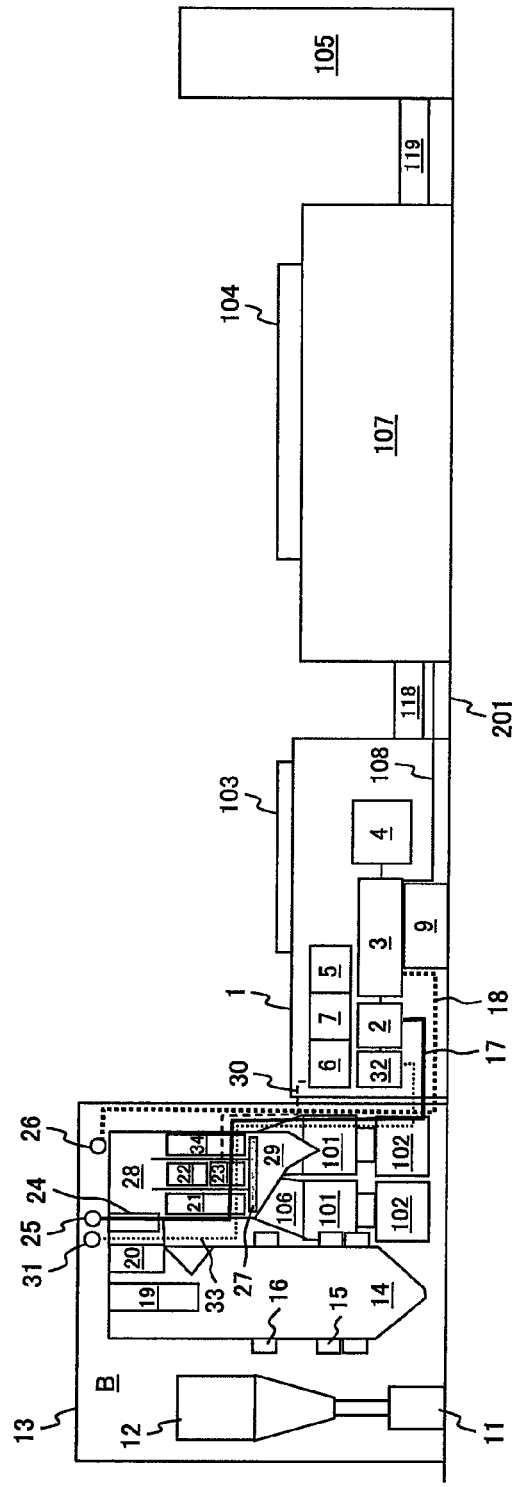
FIG. 12B is a front view showing the arrangement of Embodiment 10 of the present invention.

FIGS. 12A and 12B show Embodiment 10 of the present invention. Embodiment 10 is an example in which a two-stage reheat system is used as a heat cycle of the steam turbines. Since the two-stage reheat system has many steam pipes, material cost and installation cost can be reduced largely when the steam pipes can be shortened as in Embodiment 10.

In the two-stage reheat system, water supplied from the feed water pipe 30 is supplied to the economizer 23 of the rear heat recovery area 28. The water which has come out of the economizer 23 is supplied to the furnace 14, and is supplied to the super heater 22, the first pendant super heater 19, and the second pendant super heater 20. After that, steam is collected by a very high pressure steam final header 31, and supplied to a very high-pressure turbine 32 via a very high pressure steam pipe 33.

The steam which has come out of the very high-pressure turbine 32 is again returned to the reheater 21 of the rear heat recovery area 28, and further is collected by the main steam final header 25 via the pendant reheater 24. This steam is supplied to the high-pressure turbine 2 via the main steam pipes 17. Further, the steam which has come out of the high-pressure turbine 2 is again supplied to the reheater 34 of the rear heat recovery area 28, and is heated to a predetermined temperature. This steam is collected by the reheat steam final header 26, and supplied to the intermediate-pressure turbine 3 via the reheat steam pipes 18.

Advantages when the present invention is applied to the two-stage reheat system are as follows.

(1) The steam pipes are short.

(2) Since the arrangement of the steam pipes is symmetrical, asymmetrical stress is not generated on the turbine.

(3) Since many steam pipes are present in the two-stage reheat system but the few apparatuses are present near the rear heat recovery area 28, routes of the steam pipes can be easily determined.

[Embodiment]11

Figure 13A:
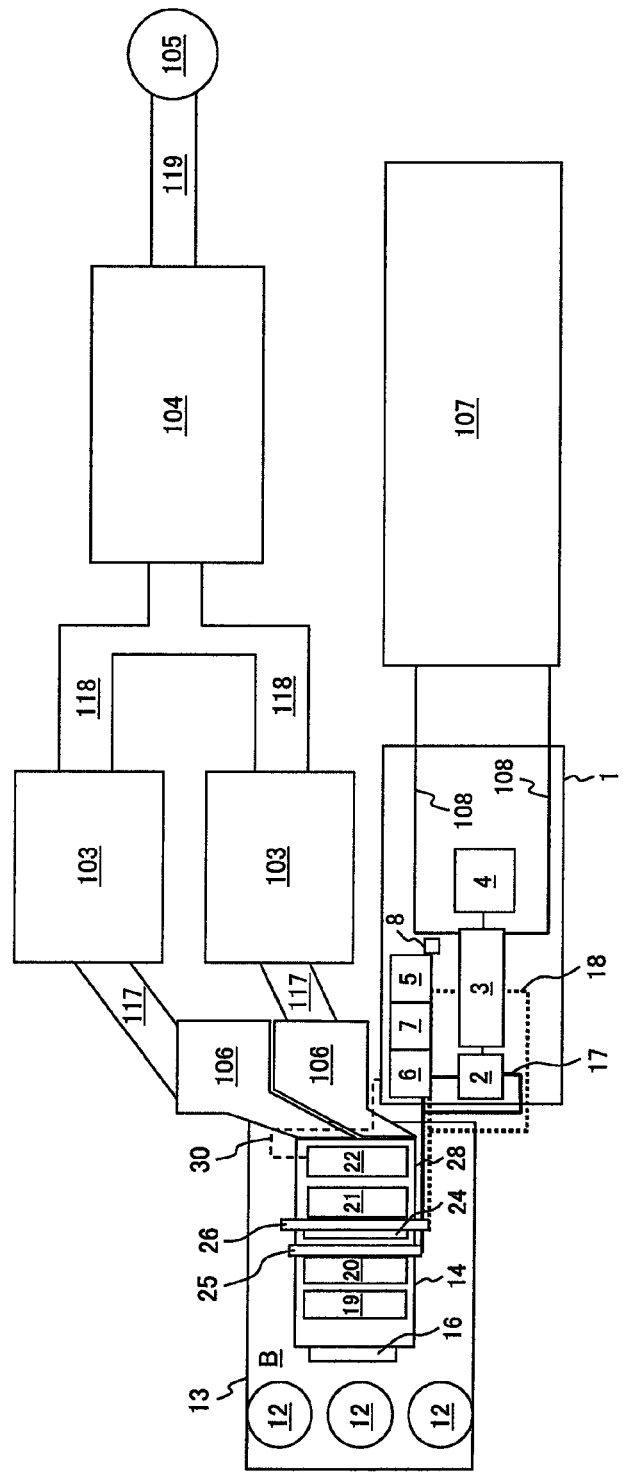
FIG. 13A is a top view showing arrangement of Embodiment 11 of the present invention.

FIGS. 13A and 13B show Embodiment 11 of the present invention. In Embodiment 11, the turbine building 1 is installed on the side of the rear heat recovery area 28 of the boiler building 13, and the air quality control system also is installed in parallel to them on the side of the rear heat recovery area 28 of the boiler building 13. That is, a wall surface of the boiler building 13 is divided into two on the side of the rear heat recovery area, one wall is in contact with the turbine building 1, and another wall is in contact with the apparatuses, the DeNOx 101 and the air heater 102. The DeNOx 101 and air heater 102 are installed below the communication ducts 106.

In Embodiment 11, the central axis for connecting the furnace 14 of the boiler B and the rear heat recovery area 28 and turbine axes are not entirely coincidental, but the main piping such as the main steam pipes 17 and reheat steam pipes 18 can be shortened. That is, advantages of Embodiment 11 are as follows.

(1) The main piping can be reduced in length.

(2) The communication ducts 106 have a shape similar to the conventional one and the air ducts and flue gas ducts are easily routed.

In Embodiment 11, each piece of main piping uses only one line. When the main piping uses two lines and the central axes of the boiler and turbines are misaligned, each pipe is different in length. Accordingly, non-uniform stresses are generated on the boiler, so that temperature and pressure of steam may be different in the right and left pipes. However, such a problem does not occur in the single line. Since the forces applied to the turbine are equalized when steam is introduced from two portions into the turbine entrances. Therefore, in Embodiment 11, the main steam pipe is branched into two on the way to supply steam.

[Embodiment]12

Figure 14A:
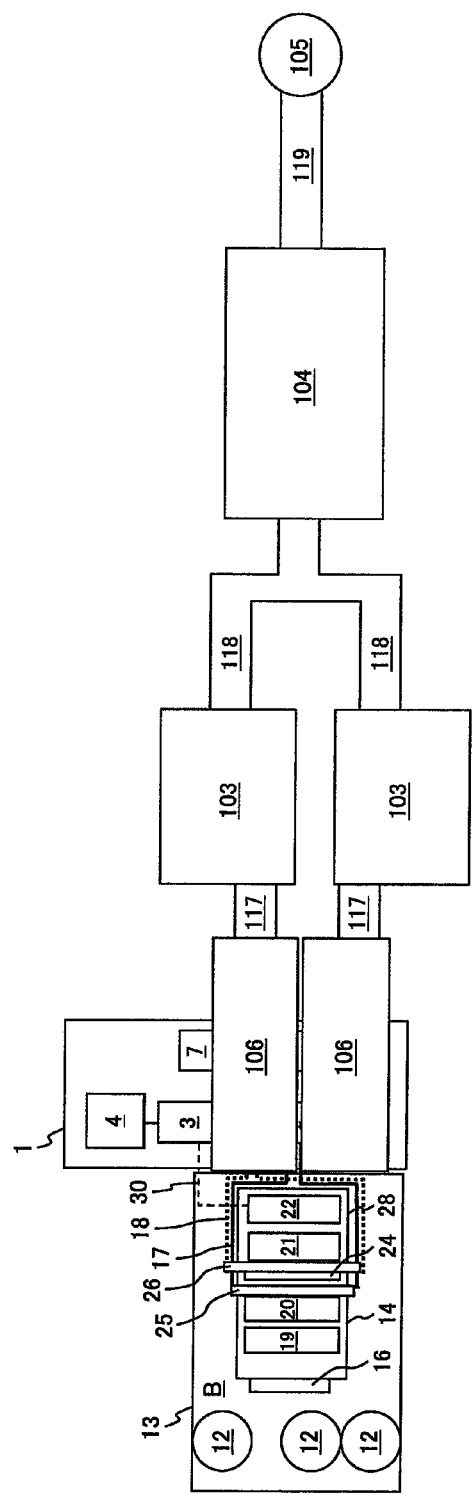
FIG. 14A is a top view showing arrangement of Embodiment 12 of the present invention.
Figure 14B:
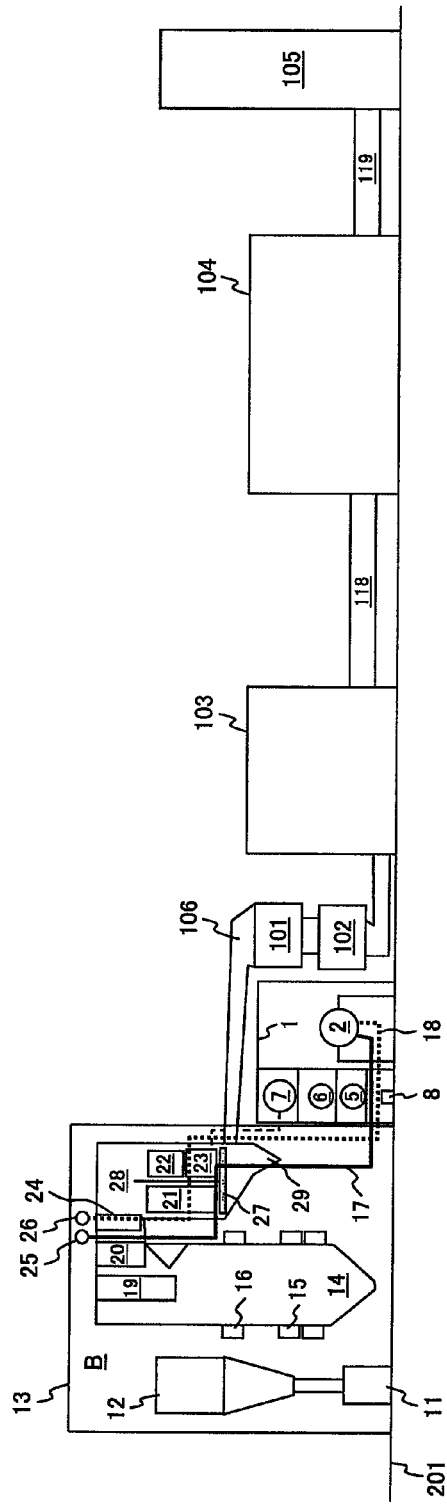
FIG. 14B is a front view showing the arrangement of Embodiment 12 of the present invention

FIGS. 14A and 14B show Embodiment 12 of the present invention. In Embodiment 12, the turbine building 1 is installed on the side of the rear heat recovery area 28 of the boiler building 13. The turbine axes are perpendicular to the boiler central axis when viewed from above two-dimensionally. That is, the turbine axes and the main steam pipe final header 25 are in parallel. The communication ducts 106 connect the rear heat recovery area 28 of boiler B to the DeNOx 101. The communication ducts 106 pass on the turbine building 1. Since ashes may accumulate in the communication ducts 106, an ash removal apparatus may be installed. The merits of Embodiment 12 are as follows.

(1) The main piping can be shortened.

(2) The interfaces of the communication ducts 106 for the rear heat recovery area 28 have a similar shape to the conventional one, and are simple.

[Embodiment]13

Figure 15:
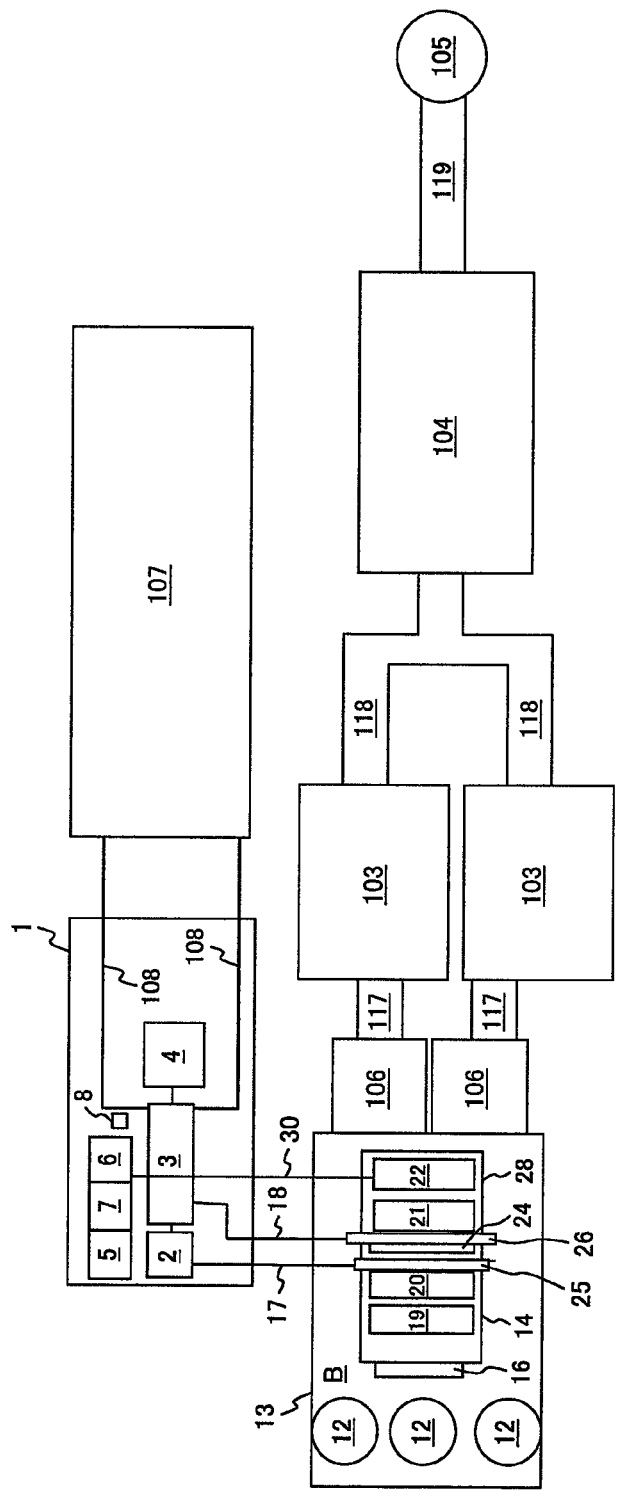
FIG. 15 is a top view showing arrangement of Embodiment 13 of the present invention.

FIG. 15 shows Embodiment 13 of the present invention. In Embodiment 13, the turbine building 1 is installed near the rear heat recovery area 28 of the boiler building 13. The turbine axes and the boiler central axis are in parallel. That is, the turbine axes and the main steam pipe final header 25 are at a right angle. The high-pressure turbine 2 is installed on the side of the furnace 14 of the boiler B, and the intermediate-pressure turbine 3 is installed on the side of the rear heat recovery area 28. By installing the boiler building 13 and turbine building 1 in such a way, the main piping such as the main steam pipe 17 and reheat steam pipe 18 can be shortened. Particularly, the steam pipes become short when each steam piping uses one line, as shown in FIG. 15. Additionally, the flue gas treatment system can be arranged in the same way as the conventional one.

[Embodiment]14

Figure 16A:
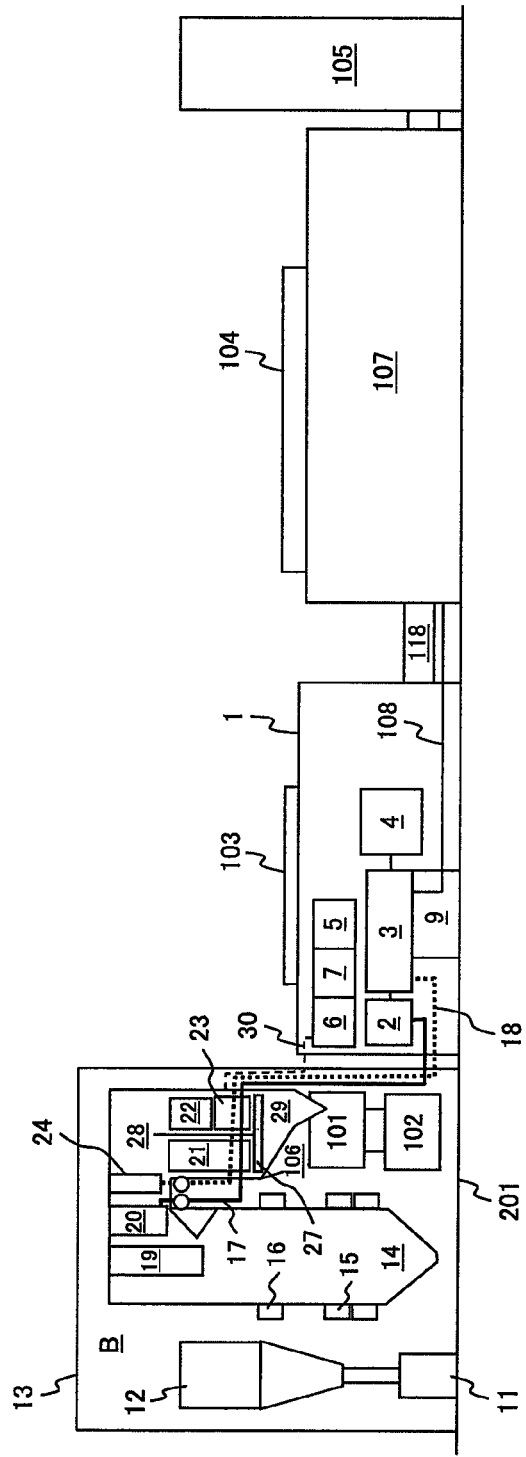
FIG. 16A is a front view showing the arrangement of Embodiment 14 of the present invention.

FIG. 16A shows embodiment 14 of the present invention. This embodiment has the same structure as Embodiment 1 shown in FIG. 1 basically, but different in the shape of the final super heater for the main steam and reheat steam. The outlet header of the final super heater is arranged below, so that a distance from the header to the steam turbines can be further shortened.

Figure 16B:
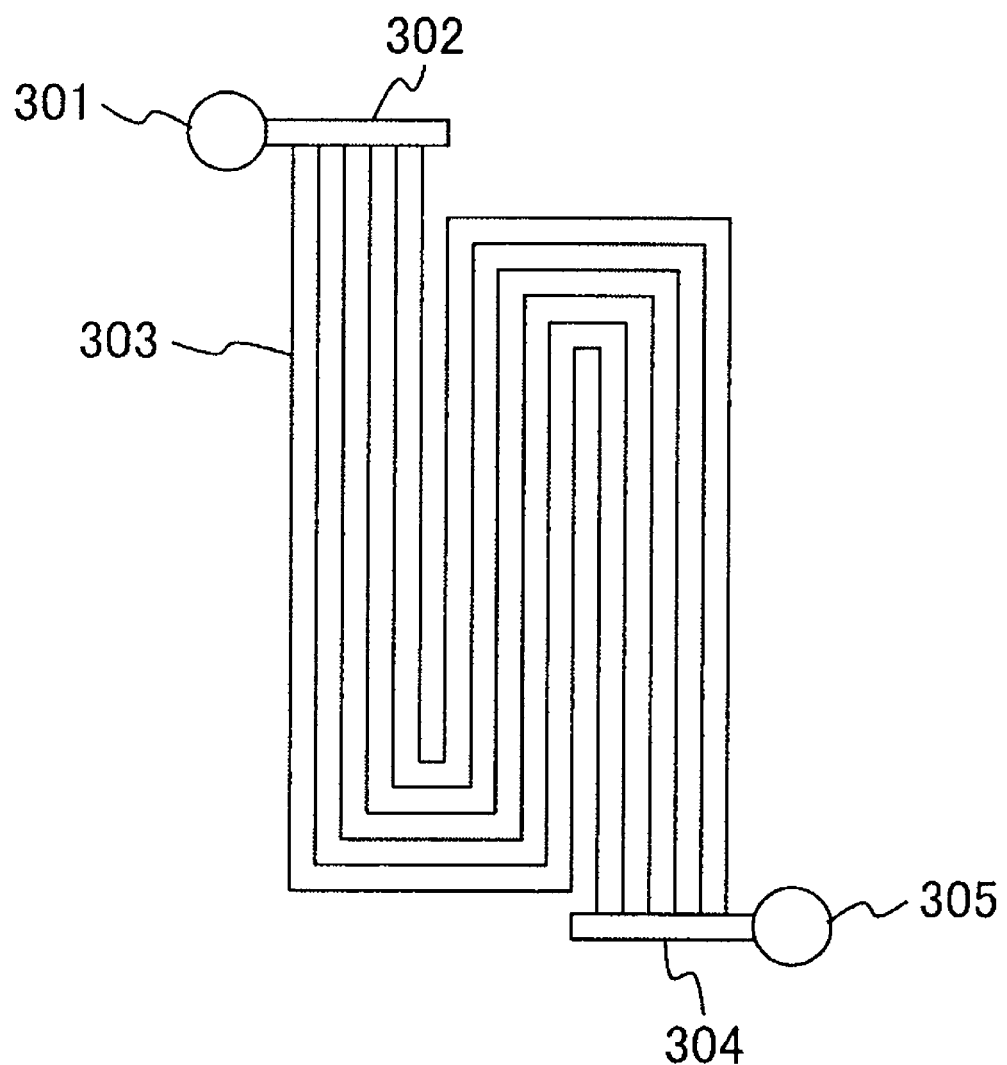
FIG. 16B is a schematic view showing the arrangement of Embodiment 14 of the present invention.

FIG. 16B shows one example of the shape of the final super heater. In this example, steam that has entered an inlet header 301 is branched into multiple steam pipes 303 at a branch pipe 302. Steam flowing through the steam pipe is heated by combustion exhaust gas and raised in temperature. Further, the steam is collected at a junction pipe 304 and supplied to a outlet header 305.

Advantage of this embodiment is not only the short length. When the outlet header 305 of the final super heater is not secured, the steam pipes 303 act as springs to be able to absorb elongation and shrinkage of the main steam pipes.

Further, in Embodiment 1, many headers need to be installed on the furnace. On the contrary, in this Embodiment 14, the headers can be distributed vertically, so that freedom of the arrangement of the headers increases. As a result, the design time and production cost can be reduced.

What is claimed is:

1. A thermal power plant comprising:
    a boiler having a 2 pass structure in which a furnace for burning fuel and a rear heat recovery area for recovering heat from exhausted combustion gas are arranged in parallel;
    a steam generator for heating water by use of heat recovered from the furnace and the rear heat recovery area of the boiler to generate steam; and
    a generator converting rotational energy to electricity by rotating steam turbines including at least a high-pressure turbine using generated steam,
    wherein
    the high-pressure turbine of the steam turbines being arranged near the rear heat recovery area of the boiler,
    a central axis of the boiler and axes of the steam turbines are coincident in direction on an installation plane of the thermal power plant, the central axis connecting the furnace and the rear heat recovery area, and
    a turbine building for housing the steam turbines is provided, an outlet of the rear heat recovery area of the boiler is divided, the turbine building and a flue gas treatment apparatus are arranged to outlets of the rear heat recovery area and arranged in parallel on the installation plane of the thermal power plant, and the axes of the steam turbines and a flow of combustion gas within the flue gas treatment apparatus are in a same direction.

2. The thermal power plant according to claim 1, wherein a header for collecting steam is provided on the furnace or on the heat recovery area, wherein two steam pipes are provided for supplying steam which has come out of the header to the steam turbines, and the two steam pipes are respectively provided to opposite sides of the central axis of the boiler and axes of the steam turbines on the installation plane of the thermal power plant.

3. The thermal power plant according to claim 1, wherein two steam pipes are provided for supplying steam which has come out of the boiler to the steam turbines, and the two steam pipes are respectively provided to opposite sides of the central axis of the boiler and axes of the steam turbines on the installation plane of the thermal power plant.

4. A thermal power plant comprising:
    a boiler having a 2 pass structure in which a furnace for burning fuel and a rear heat recovery area for recovering heat from exhausted combustion gas are arranged in parallel;

a steam generator for heating water by use of heat recovered from the furnace and the rear heat recovery area of the boiler to generate steam; and a generator converting rotational energy to electricity by rotating steam turbines including at least a high-pressure turbine using generated steam, wherein the high-pressure turbine of the steam turbines being arranged near the rear heat recovery area of the boiler;

combustion gas exhausted from the rear heat recovery area of the boiler is exhausted generally perpendicularly to a direction of a central axis of the boiler, the central axis connecting the furnace and the rear heat recovery area of the boiler on an installation plane of the thermal power plant, and the combustion gas exhausted from the rear heat recovery area of the boiler is exhausted from two portions, the two portions being perpendicular to and on opposite sides of the central axis of the boiler, the central axis connecting the furnace and the rear heat recovery area of the boiler on the installation plane of the thermal power plant.

5. The thermal power plant according to claim 4, wherein a DeNOx for removing nitrogen oxide of combustion gas is provided downstream of the rear heat recovery area of the boiler, an economizer for heating water is provided to the rear heat recovery area, bypass ducts for drawing part of the combustion gas are attached upstream of the economizer to avoid reduction of gas temperature of the DeNOx, and drawn-out directions of the bypass ducts are generally perpendicular to the direction of the central axis of the boiler.

6. The thermal power plant according to claim 4, wherein a DeNOx for removing nitrogen oxide of combustion gas is provided downstream of the rear heat recovery area of the boiler, an economizer for heating water is provided to the rear heat recovery area, bypass ducts for drawing part of combustion gas are attached upstream of the economizer to avoid reduction of gas temperature of the DeNOx, and drawn-out directions of the bypass ducts are generally in parallel to the central axis of the boiler.

7. The thermal power plant according to claim 4, wherein two groups of a DeNOx for removing nitrogen oxide of combustion gas, an air heater for heating air by use of the combustion gas, and a precipitator for removing ashes of the combustion gas are provided, and the combustion gas exhausted from the rear heat recovery area of the boiler is exhausted from one side surface of the rear heat recovery area, branched into two, and supplied to the each group of DeNOx, the air heater, and the precipitator.

8. A thermal power plant comprising:

a boiler having a 2 pass structure in which a furnace for burning fuel and a rear heat recovery area for recovering heat from exhausted combustion gas are arranged in parallel;

a steam generator for heating water by use of heat recovered from the furnace and the rear heat recovery area of the boiler to generate steam;

a generator converting rotational energy to electricity by rotating steam turbines including at least a high-pressure turbine using generated steam, the high-pressure turbine of the steam turbines being arranged near the rear heat recovery area of the boiler;

an air heater;

an air separation unit;

a duct for circulating part of combustion gas;

a mixer for oxygen produced by the air separation unit and circulated combustion gas; and a duct for supplying mixed oxygen gas to the air heater, combustion gas of the rear heat recovery area of a boiler building which houses the boiler having the furnace and the rear heat recovery area is exhausted in one direction generally perpendicular to a direction of a central axis of the boiler, the central axis connecting the furnace and the rear heat recovery area on an installation plane of the thermal power plant, and the air separation unit is provided on an exhaust side of the combustion gas of the boiler building.

* * * * *